United States Patent [19]
Terashima et al.

[11] Patent Number: 5,420,701
[45] Date of Patent: May 30, 1995

[54] THIN-TYPE FACSIMILE APPARATUS

[75] Inventors: Hideyuki Terashima, Sagamihara; Minoru Yokoyama, Yokohama; Masakatsu Yamada, Kawasaki, all of Japan

[73] Assignee: Canon Kabushiki Kaisha, Tokyo, Japan

[21] Appl. No.: 145,200

[22] Filed: Nov. 3, 1993

[30] Foreign Application Priority Data

| Nov. 11, 1992 | [JP] | Japan | 4-300813 |
| Nov. 11, 1992 | [JP] | Japan | 4-300815 |
| Nov. 16, 1992 | [JP] | Japan | 4-305114 |
| Nov. 16, 1992 | [JP] | Japan | 4-305115 |
| Nov. 16, 1992 | [JP] | Japan | 4-305388 |

[51] Int. Cl.⁶ ............... G03G 21/00; H04N 1/387
[52] U.S. Cl. .................. 358/498; 358/496; 355/308; 355/309; 355/310
[58] Field of Search .............. 358/400, 473, 474, 476, 358/478, 496, 498; 355/72, 75, 311, 308, 309, 310

[56] References Cited

U.S. PATENT DOCUMENTS

| 4,442,459 | 4/1984 | Fukui et al. | 358/476 |
| 4,748,516 | 5/1988 | Harano et al. | 358/476 |
| 4,768,100 | 8/1988 | Kunishima et al. | 358/498 |
| 5,040,206 | 8/1991 | Tokumasu et al. | 358/400 |
| 5,115,374 | 5/1992 | Hongoh | 358/400 |

OTHER PUBLICATIONS

"Fax Buyer's Guide", Guide No. 6, Bedford Communications, Inc., pp. 17, 44 and 45.

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

A slender, compact facsimile apparatus having the minimum required functions of a full-size facsimile apparatus and in which pre-cut sheets of recording paper or recording paper in roll form can be used selectively includes an apparatus main body having a first opening provided in top side, a second opening provided in the top side rearwardly of the first opening, and a third opening provided in a front side; an original reading section provided at a forward portion of the apparatus main body and having a reading sensor and a first roller for conveying an original; a recording section provided rearwardly of the original reading section and having a recording head and a second roller for conveying a recording sheet; a power-supply accommodating portion provided rearwardly of the recording section; an original conveyance path provided between the first opening and the third opening of the apparatus main body; and a recording-sheet conveyance path provided between the first opening and the second opening of the apparatus main body. The recording-sheet conveyance path and the original conveyance path are formed so as to be contiguous between the reading sensor and the recording head.

16 Claims, 29 Drawing Sheets

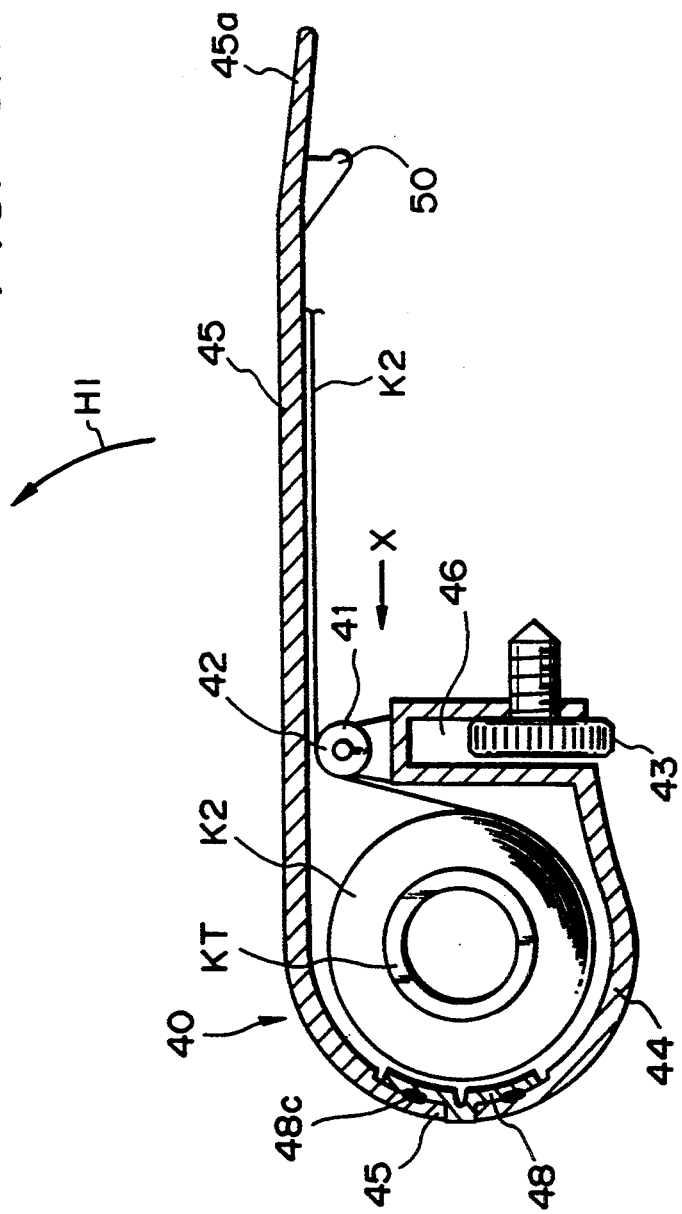

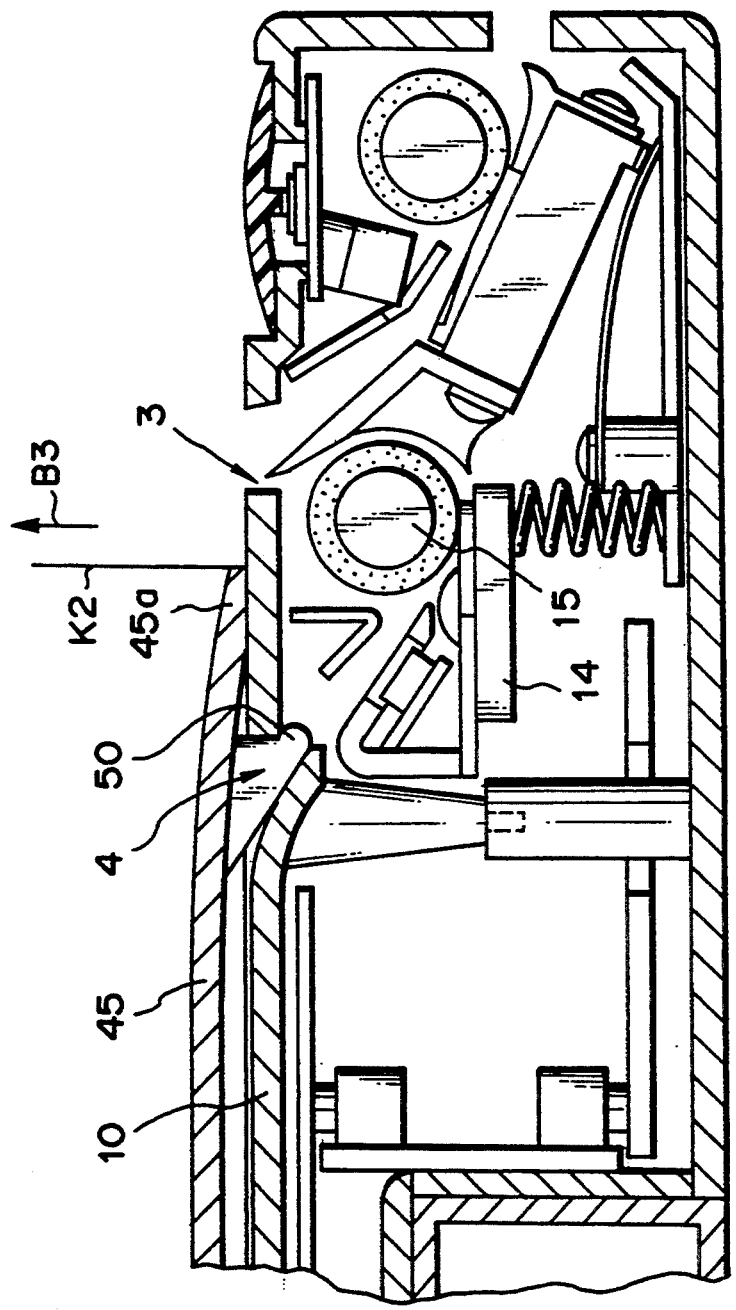

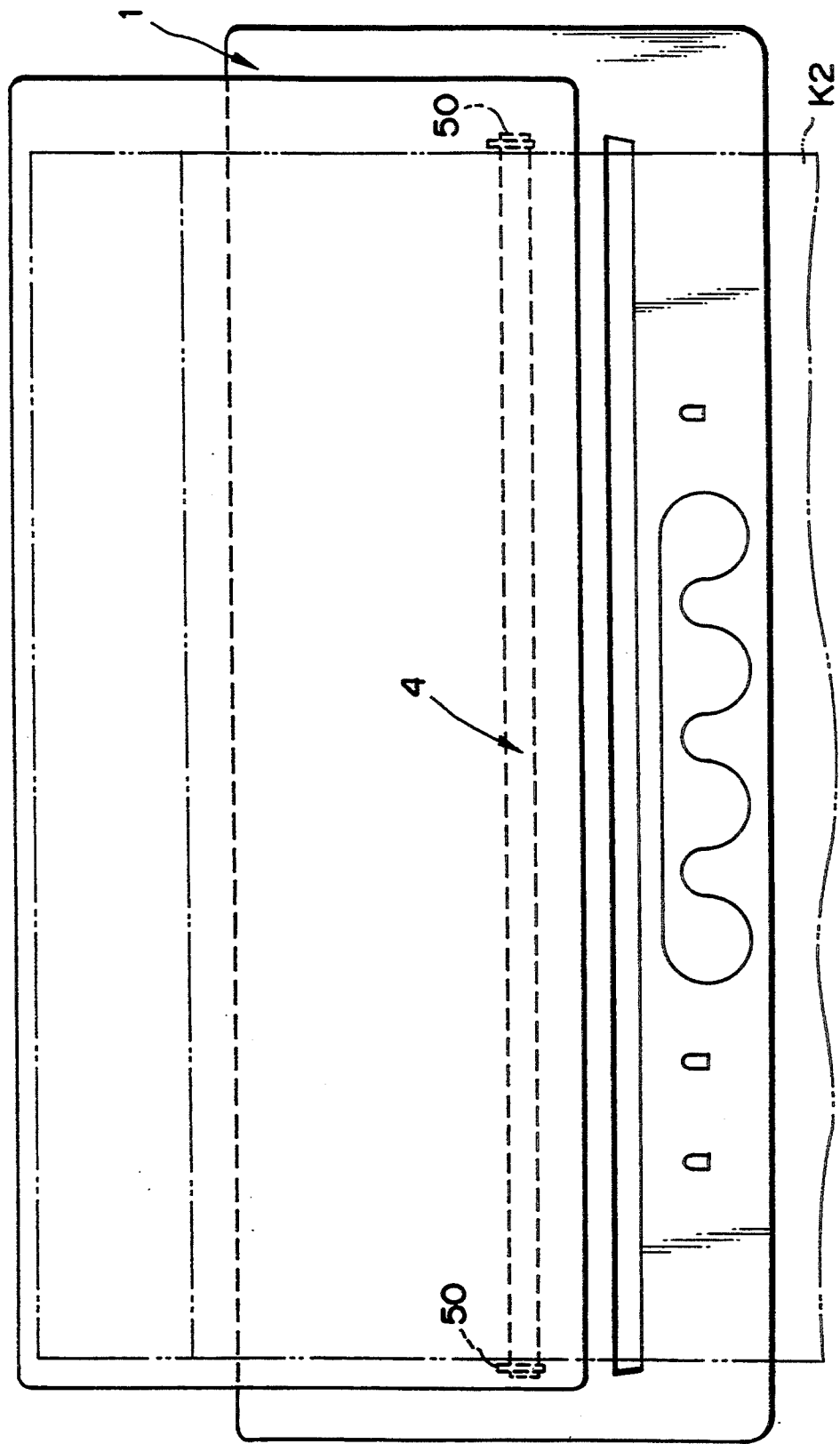

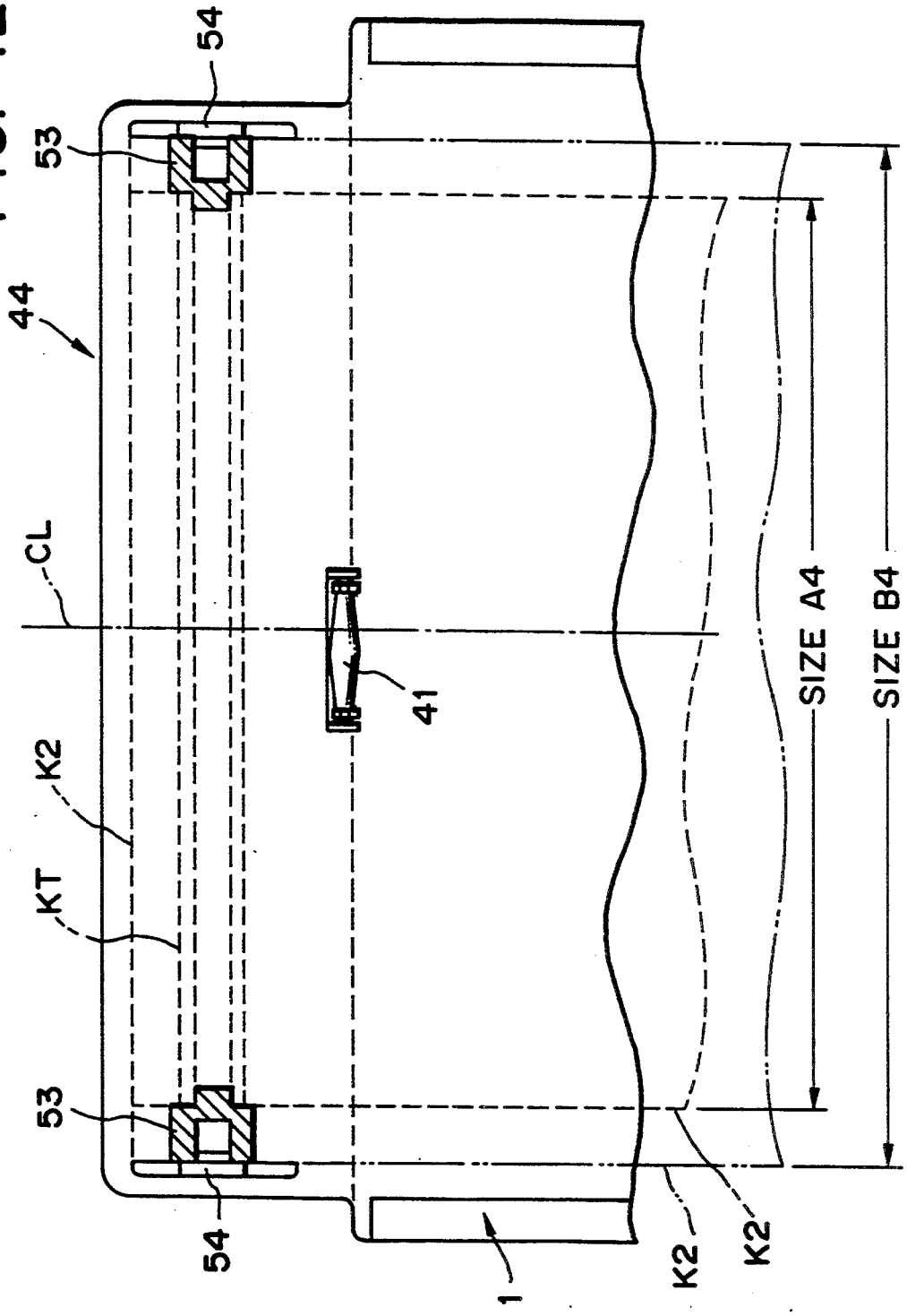

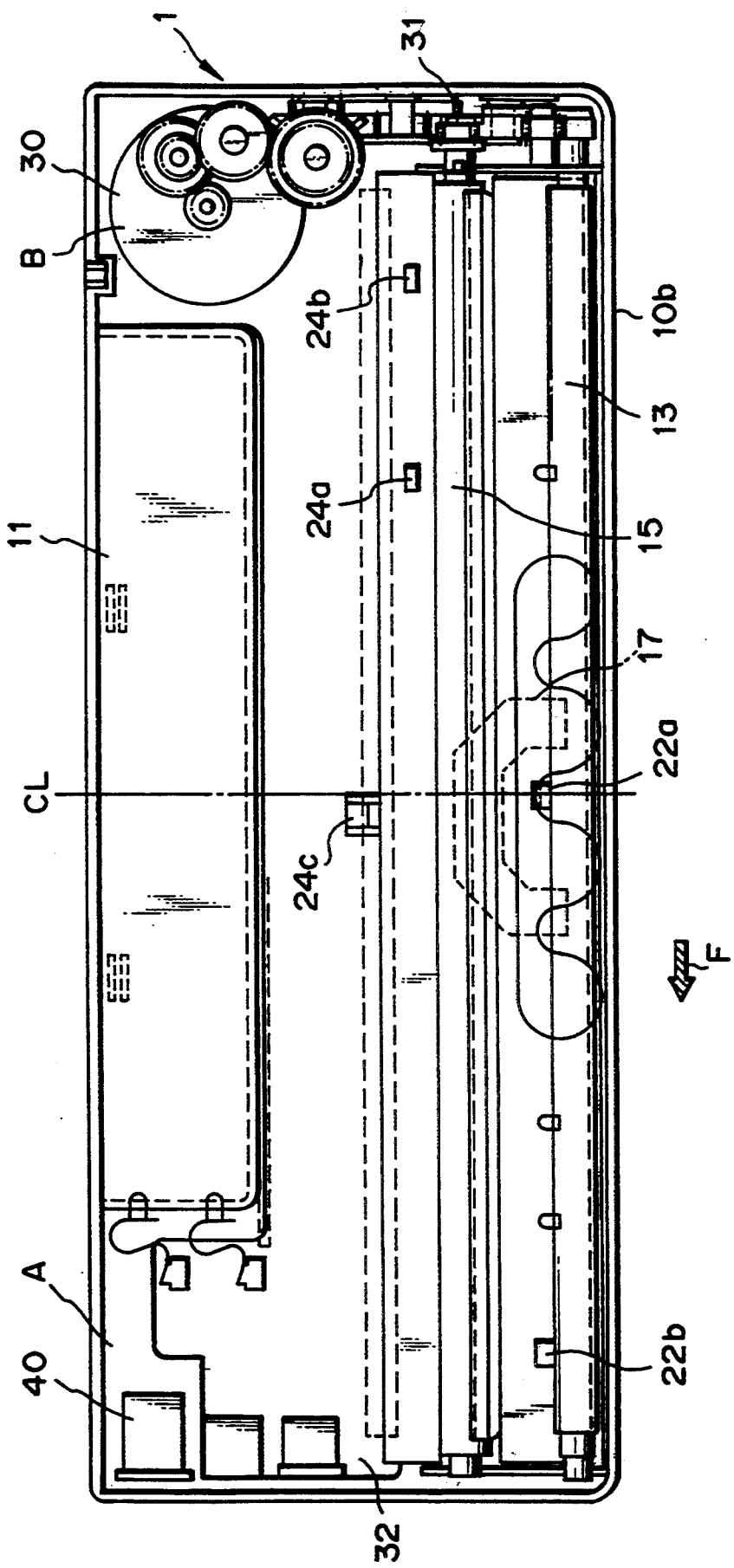

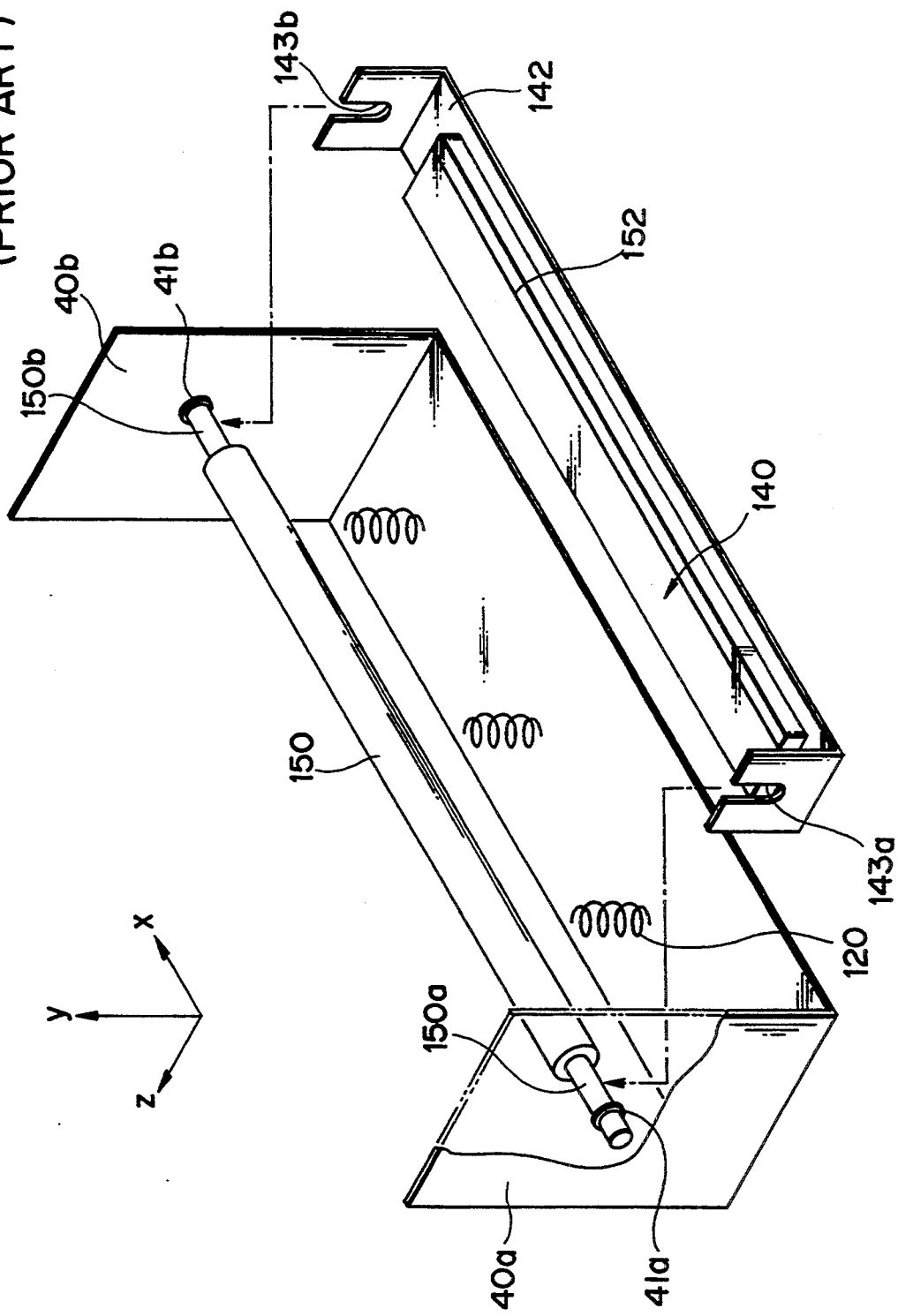

THIN-TYPE FACSIMILE APPARATUS

BACKGROUND OF THE INVENTION

This invention relates to a facsimile apparatus and, more particularly, to a facsimile apparatus constructed to be flat and small in size.

A facsimile apparatus constructed to be small in size has been proposed in the art. The recording section and the original reading section of this facsimile apparatus will now be described with reference to the drawings.

FIG. 26 is a transverse sectional view illustrating a facsimile apparatus according to the prior art. This represents an example of the smallest, flattest arrangement said to be available at the present time. A cover 200 serving also as a casing has a top side provided with a first opening 203 in the vicinity of the edge thereof, and a second opening 204 located further to the rear. The casing cover 200 also has a front side provided with an exit port 205.

In this arrangement, an original G is placed face down and inserted into the first opening 203. The original is conveyed and discharged from the exit port 205 while clamped between a contact-type line image sensor 12 and a first biasing roller 13 rotatively driven in a state biased with respect to the line image sensor 12.

A roll KR of thermosensitive recording paper K2 is replaceably supported in a freely rotatable manner (in the direction indicated by the arrow) on the underside of the cover 200. The recording paper K2 is so arranged that its recording side opposes the recording portion of a line thermal head 140. The recording paper K2 is clamped between the line thermal head 140 and a second biasing roller 150 rotatively driven while biased with respect to the head 140. While thus clamped, the recording paper K2 is discharged to the exterior of the apparatus via the second opening 204 after being recorded on.

By virtue of the configuration described above, the reading section and the recording section are arranged to overlap in the thickness direction of the casing cover 200, thereby making it possible to greatly reduce the thickness of the casing cover 200.

FIG. 27 is a perspective exploded view showing the details of the recording section. As shown in FIG. 27, the line thermal head 140 and the conveyance roller 150 are arranged as illustrated. The line thermal head 140 is secured to a head supporting member 142. The line thermal head 140 is so adapted as to be biased at three locations on its underside by compression springs 120 after it is installed. The coil springs 120 at the two ends are situated so that the distance between them is less than the width of the recording paper.

The positioning mechanism of the line thermal head 140 and conveyance roller 150 constructed as set forth above is the most important component in terms of the recording section. The line thermal head 140 and conveyance roller 150 must be in a stable state at all times and the outer circumferential surface of the roller must contact a printing line (heating element) 152.

Accordingly, in the conventional apparatus, the conveyance roller 150 is freely rotatably supported by bearings 41a, 41b arranged on side plates 40a, 40b. The line thermal head 140 is mounted on a head supporting member 142 machined to have a generally U-shaped configuration, as shown in FIG. 27. Roller biting grooves 143a, 143b provided in side plates of the head supporting member 142 embrace conveyance roller shafts 150a, 150b, respectively, thereby deciding the positional relationship of the line thermal head 140 relative to the conveyance roller 150.

In accordance with this arrangement, the head supporting member 142 and the conveyance roller 150 are maintained in a stable relative positional relationship at all times if the centers of the conveyance roller biting grooves 143a, 143b in both side plates of the head supporting member 142 and the printing line 152 of the line thermal head 140 can be set to lie on a straight line. As a result, the roller 150 can be brought into accurate contact with the printing line 152.

In order to realize a portable facsimile apparatus, downsizing each constituent unit of the apparatus if of paramount importance. Accordingly, with regard first of all to the size of the recording section in the width direction, the minimum required elements are two in number, namely the recording head and the side plates that are for freely rotatably supporting the conveyance roller. An arrangement in which one side plate of the main body, the head and the other side plate of the main body are arranged in the order mentioned in the width direction provides the smallest positioning mechanism.

More specifically, in the conventional facsimile apparatus described above, the side plate 40a of the main body, the head supporting 143a, the head 140, the head supporting member 143b and the side plate 40b of the main body are arranged in the order mentioned in the width direction of the recording section. The thickness of the head supporting members 142 and the dimensions of the clearances needed for installing them are large. This makes it necessary extra width for the relative positioning mechanism of the portable facsimile apparatus.

Further, when the elastic modulus of bending of the thermal head is compared with that of the conveyance roller in the conventional facsimile apparatus, the coefficient of the thermal head is about four times that of the conveyance roller. Therefore, in the case where the thermal head is biased with respect to the conveyance roller by the biasing members, the spring biasing force is high even though the three points are biased solely by the compression springs 120. As a consequence, the conveyance roller adapts itself to the head shape even though the head is in the flexed state so that the thermal head is uniformly biased in its axial direction.

However, in consideration of downsizing as mentioned above, it is better to use a thin-type thermal head that has half the thickness of the conventional apparatus. In such case the elastic modulus of bending of the thermal head will be ⅛ of the conventional apparatus. If this thin-type head is biased by the compression coils spring 120 at the three points in the same way as mentioned above and, moreover, it is biased at a biasing force of 1.5 kg, which is half that of the prior art, the roller 150 will not adapt itself to the shape of the thin thermal head 140. Rather, the thermal head 140 having the low elastic modulus of curvature will adapt itself to the shape of the roller 150.

At such time, when use is made of the head 140 which is in the downwardly flexed state because of use of the compressed coil springs 120 to achieve biasing at three points, the two ends of the head 140 float free of the roller 150. The problem that results is that uniform biasing cannot be achieved in the axial direction, which is indicated by arrow y.

Further, in order to reduce the thickness of the casing in the above-described facsimile apparatus, the roll recording paper KR is disposed between the reading section and the recording section. As a result, it is necessary that the dimensions of the case in the depth direction be made at least large enough to accommodate the roll recording paper KR. Therefore, a problem which arises is that the apparatus cannot be made small in the depth direction.

Furthermore, in order to use the above-described facsimile apparatus as a portable facsimile apparatus, a battery is mounted to serve as the power supply. In such case, a so-called battery pack is employed. However, since the battery pack ordinarily is of such type that it is loaded and unloaded on the outside the casing, the external dimensions of the apparatus increase accordingly.

In accordance with the above-described facsimile apparatus, only rolled recording paper is used as the recording paper; a thermosensitive recording paper in pre-cut sheets, such as size A4, cannot be introduced to the recording section. More specifically, in order to make it possible to introduce pre-cut sheets of recording paper to the recording section, a very troublesome operation is required, such as introducing the pre-cut sheets after the roll recording paper is removed first. This makes it substantially impossible to employ pre-cut sheets. In a case where a special-purpose opening for inserting pre-cut sheets is provided anew near the aforementioned first opening, by way of example, the strength of a rod-shaped partition formed between the first opening and the above-mentioned opening, which has a length at least as great as the A4 width of the pre-cut sheets, cannot be assured. This makes it substantially impossible to set pre-cut sheets in place.

Further, in order to reduce the thickness of the casing in the above-described facsimile apparatus, the roll recording paper KR is disposed between the reading section and the recording section. As a result, it is necessary that the dimensions of the case in the depth direction be made at least large enough to accommodate the roll recording paper KR. Therefore, a problem which arises is that the apparatus cannot be made small in the depth direction.

In order to realize a portable facsimile apparatus, downsizing each constituent unit of the apparatus if of paramount importance. Accordingly, with regard first of all to the size of the recording section in the width direction, the minimum required elements are two in number, namely the recording head and the side plates that are for freely rotatably supporting the conveyance roller. An arrangement in which one side plate of the main body, the head and the other side plate of the main body are arranged in the order mentioned in the width direction provides the smallest positioning mechanism.

More specifically, in the conventional facsimile apparatus described above, the side plate 40a of the main body, the head supporting 143a, the head 140, the head supporting member 143b and the side plate 40b of the main body are arranged in the order mentioned in the width direction of the recording section. The thickness of the head supporting members 142 and the dimensions of the clearances needed for installing them are large. This makes it necessary extra width for the relative positioning mechanism of the portable facsimile apparatus.

Further, when the elastic modulus of bending of the thermal head is compared with that of the conveyance roller in the conventional facsimile apparatus, the coefficient of the thermal head is about four times that of the conveyance roller. Therefore, in the case where the thermal head is biased with respect to the conveyance roller by the biasing members, the spring biasing force is high even though the three points are biased solely by the compression springs 120. As a consequence, the conveyance roller adapts itself to the head shape even though the head is in the flexed state so that the thermal head is uniformly biased in its axial direction.

However, in consideration of downsizing as mentioned above, it is better to use a thin-type thermal head that has half the thickness of the conventional apparatus. In such case the elastic modulus of bending of the thermal head will be ⅛ of the conventional apparatus. If this thin-type head is biased by the compression coils spring 120 at the three points in the same way as mentioned above and, moreover, it is biased at a biasing force of 1.5 kg, which is half that conventionally, the roller 150 will not adapt itself to the shape of the thin thermal head 140. Rather, the thermal head 140 having the low elastic modulus of curvature will adapt itself to the shape of the roller 150.

At such time, when use is made of the head 140 which is in the downwardly flexed state because of use of the compressed coil springs 120 to achieve biasing at three points, the two ends of the head 140 float free of the roller 150. The problem that results is that uniform biasing cannot be achieved in the axial direction, which is indicated by arrow y.

Further, in order to reduce the thickness of the casing in the above-described facsimile apparatus, the roll recording paper KR is disposed between the reading section and the recording section. As a result, it is necessary that the dimensions of the case in the depth direction be made at least large enough to accommodate the roll recording paper KR. Therefore, a problem which arises is that the apparatus cannot be made small in the depth direction.

In accordance with the above-described facsimile apparatus, only rolled recording paper is used as the recording paper; a thermosensitive recording paper in pre-cut sheets, such as size A4, cannot be introduced to the recording section. More specifically, in order to make it possible to introduce pre-cut sheets of recording paper to the recording section, a very troublesome operation is required, such as introducing the pre-cut sheets after the roll recording paper is removed first. This makes it substantially impossible to employ pre-cut sheets. In a case where a special-purpose opening for inserting pre-cut sheets is provided anew near the aforementioned first opening, by way of example, the strength of a rod-shaped partition formed between the first opening and the above-mentioned opening, which has a length at least as great as the A4 width of the pre-cut sheets, cannot be assured. This makes it substantially impossible to set pre-cut sheets in place.

Further, when the conveyance path of the recording paper and the conveyance path of the original are provided independently of each other, as in the illustrated facsimile apparatus, individual guide members must be provided. This is an impediment to downsizing. Further, since separate exit ports are also provided, it is difficult to assure the rigidity of the casing.

Furthermore, in accordance with the conventional facsimile apparatus, as shown in FIG. 26, a blade portion is formed as an integral part of the casing at the exit port 204 of the recording paper in order that the operator may tear off of the recording paper. However, since the casing is a part of the apparatus handled directly by the operator, the blade portion poses a hazard. This can lead to problems in terms of product liability (PL).

SUMMARY OF THE INVENTION

Accordingly, an object of the present invention is to provide a compact, flat facsimile apparatus in which pre-cut sheets of recording paper and recording paper in roll form can be used selectively.

Another object of the present invention is to provide a facsimile apparatus in which a power-supply battery can be loaded and unloaded with ease in a case where the apparatus is used as a portable facsimile apparatus.

Another object of the present invention is to provide a compact, flat facsimile apparatus the dimensions of which in the depth direction in the longitudinal direction of the case can be made small, and in which it is possible to use pre-cut sheets of recording paper.

A further object of the present invention is to provide a facsimile apparatus in which such components as a reading section, recording section, electronic circuit board and battery are arranged inside a case in an efficient manner, thereby making it possible to reduce the external dimensions in the front-to-back and left-right directions.

Still another object of the present invention is to provide a facsimile apparatus having a line head biasing mechanism in which, even when the width of the recording section is reduced and a thin-type head is used in order to obtain a compact apparatus, the head and the conveyance roller can be brought into uniform, intimate contact with a small biasing force.

Yet object of the present invention is to provide a facsimile apparatus in which safety is assured.

According to the present invention, the foregoing objects are attained by providing a slender, compact facsimile apparatus having the minimum required functions of a full-size facsimile apparatus and in which pre-cut sheets of recording paper or recording paper in roll form can be used selectively, the apparatus comprising an original reading section in which an original to be read is inserted or discharged from a first opening provided in the top side of a case and discharged or inserted from a front-side opening provided on a front side; a reading section in which a recording sheet is inserted from a second opening, which is provided in a portion of the case further to the rear than the first opening, and is discharged via the first opening; a power-supply accommodating portion for detachably holding a power-supply unit, which supplies electric power, at a side of the case rearward of the recording section, and a roll-sheet holder for supplying a recording sheet in roll form to the recording section from the vicinity of the back side of the case, the roll-sheet holder being retained in a freely detachable manner on the casing. It is possible to use pre-cut sheet and roll paper selectively and to construct the facsimile apparatus to be small and flat.

Preferably, a cover member of the roll-sheet holder protects the recording sheet in roll form and prevents the roll sheet for penetrating the second opening again owing to curling of the paper after it is discharged from the first opening.

Preferably, the recording sheet in roll form is moved along the top side of the case and then is inserted into the second opening to be set in a supply state. As a result, a conveyance path of the recording sheet within the case is no longer necessary. This makes it possible to downsize the case when using pre-cut sheets in a case where the roll-sheet holder is not attached.

Preferably, the cover member is provided to open and close freely in a state in which the roll-sheet holder is secured to the case. By establishing a state in which the roll recording sheet and the portion between the second opening and first opening are covered and a state in which the roll recording sheet and the portion between the second opening and first opening are exposed, the roll recording sheet can be exchanged in a simple manner. Merely opening the cover member makes it possible to use pre-cut recording paper even in the state in which the roll-sheet holder is secured to the case.

Preferably, the power-supply unit is a power-supply battery pack of a primary cell or a secondary cell. By providing the power-supply power pack so that it may be attached and detached freely in a direction substantially perpendicular to the bottom of the case, the battery pack can be attached and detached in a simple manner even if the roll-sheet holder is attached to the case and a roll recording sheet is inserted into the second opening.

Preferably, the cover member has a pair of engaging portions for engaging both ends of the second opening of the case, and a blade for tearing off an edge portion of the roll recording sheet. The engaging portions are provided at positions spaced farther apart than the maximum recording width of the roll recording sheet capable of being loaded in the roll-sheet holder. As a result, a recording sheet in a disordered state in which the leading edge is not linear is cut off at the blade, after which it can be set in a supply state with facility.

Preferably, the supporting portion comprises a pair of pin members provided on the left and right end faces of the line head, and a longitudinal slot along the direction of the normal line formed in the main-body member in order to guide the pin members, the limiting portion comprising a limiting hole formed in the main-body member in a direction substantially perpendicular to the longitudinal direction of the longitudinal slot, and a pin member provided on the side of the line head and guided by the limiting hole.

Preferably, the supporting portion comprises a pair of pin members provided on the left and right end faces of the line head, and a longitudinal slot along the direction of the normal line formed in the main-body member in order to guide the pin members, the limiting portion comprising a limiting hole formed in either the left or right end face of the line head in a direction substantially perpendicular to the longitudinal direction of the longitudinal slot, and a pin member provided on the side of the main-body member and guided by the limiting hole.

Preferably, a plurality of equidistantly spaced biasing members are provided for biasing the line head so that it will adapt itself to the direction of the normal line, and urging points relying upon biasing members disposed at least at both ends are situated outside the width of recording and original sheets.

Preferably, urging points for biasing the line head by the biasing members are six or more in number.

Preferably, an intervening member having urging points with the line head greater in number than the urging points relying solely upon the biasing members is disposed between the underside of the line head and the biasing members.

By virtue of this arrangement, there is provided the intervening member having urging points with the line head greater in number than the urging points relying upon the biasing members. By virtue of the line head, the roller rotatably supported on the main-body member, the supporting portion provided on both end faces of the line head in the longitudinal direction thereof for determining the relative positional relationship between the line head and the roller, and the limiting portion for limiting the angle of the line head, an arrangement in which space can be minimized at least in the width direction is made possible.

Further, the urging points of the line head urged by the biasing members (compression coil springs) between the head and a frame are increased to six or more, and the biasing members on both ends are arranged so as to lie outside the width of the paper used. If it is desired to use a flat-type line head having a small elastic modulus, for example, flexing of the head is absorbed and the line head and roller can be brought into uniform contact in the axial direction.

Preferably, the reading means is composed of a contact sensor in which a conveyed original is held in a biased state, and a first biasing roller rotatively driven with respect to the contact sensor, and the recording means is composed of a line head to which the recording sheet is conveyed, and a second biasing roller rotatively driven in a biased state with respect to the line head. An opening serving as both an insertion port and a discharge port of the original and recording sheet is provided on a top side of a case, and the reading means and recording means are provided in front and in back of the opening. A dual-purpose member is provided as an integral part of the contact sensor and has a relative positioning portion for relatively positioning the contact sensor with respect to the first biasing roller, and a guiding portion for guiding the original and the recording sheet so as to move along the opening.

Preferably, the dual-purpose member has a ridge line formed to include a blade portion for cutting the recording sheet, the blade portion being provided internally of the opening of the case of the facsimile apparatus.

Preferably, the dual-purpose member is relatively positioned and free to rock in a state in which it is provided as an integral part of the sensor of the reading means, the dual-purpose member being provided with a biasing spring for biasing the biasing roller so as to lie substantially along the direction of a normal line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8A is a transverse sectional view showing the roll-sheet holder;

FIG. 8B is a view seen along arrow X in FIG. 8A;

FIG. 9B is a transverse sectional view showing the area around a tip portion of a cover;

FIG. 10 is a plan view showing the compact facsimile apparatus after being combined with the roll-sheet holder;

FIG. 12 is a partial plan view showing the compact facsimile apparatus after being combined with the roll-sheet holder;

FIG. 17 is a plan view of the facsimile apparatus;

FIG. 27 is an external view of a line head biasing mechanism according to the prior art.

DESCRIPTION OF THE PREFERRED EMBODIMENTS

Figure 1A:
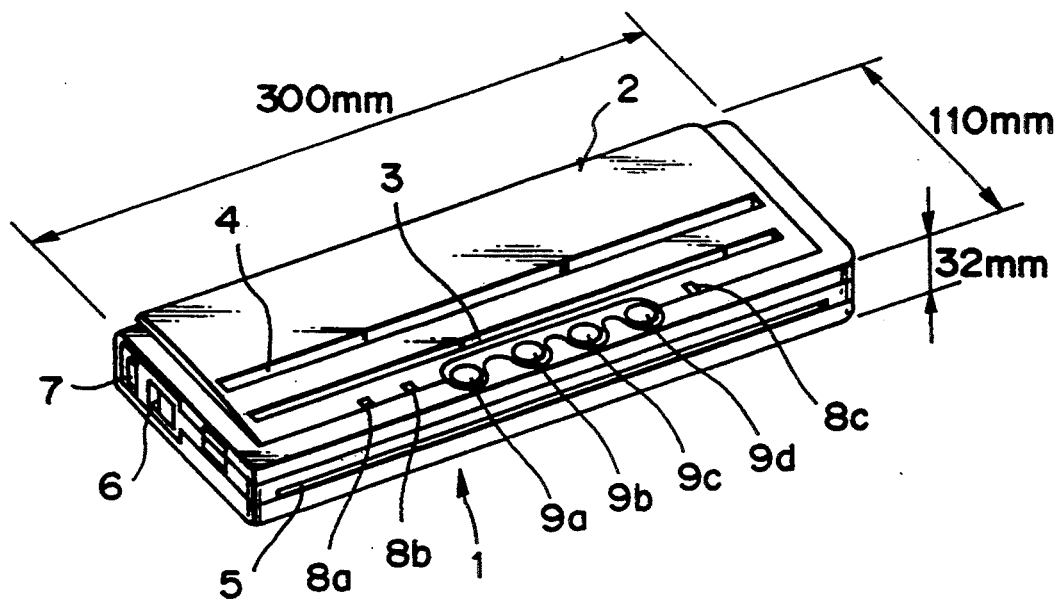
FIG. 1A is an external perspective view showing a compact facsimile apparatus according to an embodiment.
Figure 1B:
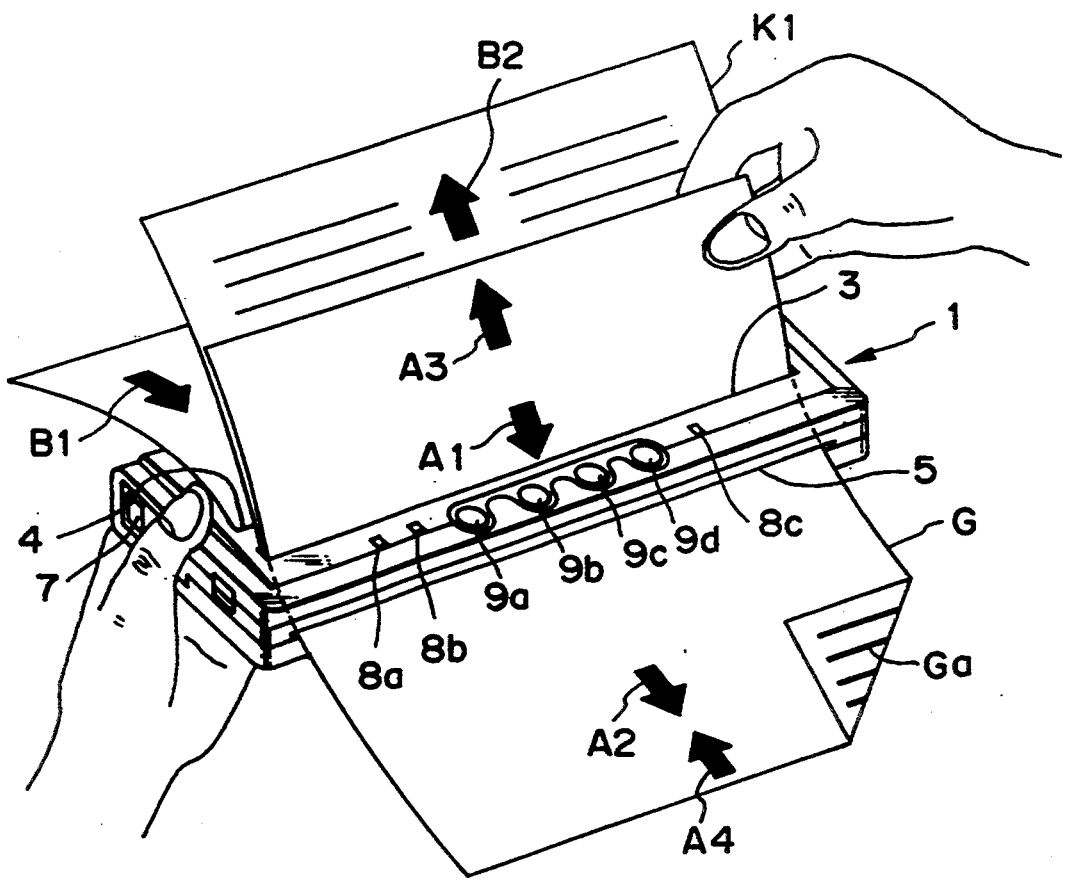
FIG. 1B is an external perspective view showing the compact facsimile apparatus of this embodiment in use.

Preferred embodiments of the present invention will now be described in detail with reference to the drawings. FIG. 1A is an external perspective view showing a compact facsimile apparatus 1 according to a first embodiment of the invention. Here the apparatus is shown before an original and recording paper have been set in place. FIG. 1B is an external perspective view showing the compact facsimile apparatus in use. Specifically, here an original G and recording paper K1 have been set in place, after which they are conveyed in the directions indicated by the arrows.

As shown in FIG. 1A, a casing cover 2 is produced by the injection molding of resin or the like and is formed so as to be capable of being separated into upper and lower halves. As indicated by the dimensions shown in FIG. 1A, the casing cover 2 is small in size, having a width of 300 mm, a breadth of 110 mm and a thickness of 32 mm. As a result, the facsimile apparatus 1 can readily be carried about in an ordinary brief case or attaché case. The case cover has an internal battery power supply and facsimile function, which will be described later. If the portable facsimile apparatus is connected to a prescribed telephone line, it can be used outdoors and in an automobile or the like to provide a portable facsimile function. Furthermore, it is possible to downsize the facsimile apparatus.

The case cover 2 of the compact facsimile apparatus 1 having the aforementioned external dimensions has an upper side in FIG. 1A formed to include a first opening 3 having a width that will allow the insertion of an original up to a maximum width of size B4, and a second opening 4 having a width for inserting recording paper having a maximum width of size B4. The front side of the case cover 2 is formed to have an exit port 5 for discharging originals up to size B4 in terms of width. The original G may be inserted from the discharge port 5 in the direction of arrow A3 or from the first opening 3 in the direction of arrow A4.

The upper side of the case body 2 in the vicinity of one edge thereof is provided with operating switches 9 that include a switch 9a for setting a fine mode or standard mode, a switch 9b for setting a copy mode or feed mode, a stop switch 9c and a start switch 9d for starting operation in a transmitting state when an original has been set in place and in a receiving state when no original has been set in place. An LED 8c for indicating the power-on state is provided at the right of these switches, an LED 8a for indicating an operating error is provided at the left of the switches, and an LED 8b for displaying that the fine mode has been set is provided to the right of the LED 8a. A power-supply switch 7 and an external connector 6, which is for connecting the compact facsimile apparatus 1 to a telephone, are disposed on the left side of the apparatus 1.

As illustrated in FIG. 1B, an original G having a printed side Ga is inserted, with the side Ga facing down, into the first opening 3 in the direction of arrow A1, and the original is discharged from the apparatus via the exit port 5. A pre-cut sheet K1 of thermosensitive recording paper is inserted via the second opening 4 in the direction of arrow B1, after which it is discharged from the first opening 3 in the direction (upward) indicated by arrow B2. Thus, the facsimile apparatus 1 is capable of performing an operation for reading an original and a recording operation in units of the cut sheets of paper.

More specifically, the compact facsimile apparatus 1, having the flat, compact configuration described above, can be operated by holding the apparatus in one hand and inserting originals one sheet at a time using the other hand. For reception, the pre-cut sheet K1 of thermosensitive recording paper is inserted into the second opening 4 to allow reception of a document. If the user wishes to make a copy, the original G and cut sheet K1 are set in place simultaneously, without connecting the apparatus to a line, so that copies can be made one sheet at a time.

Figure 2:
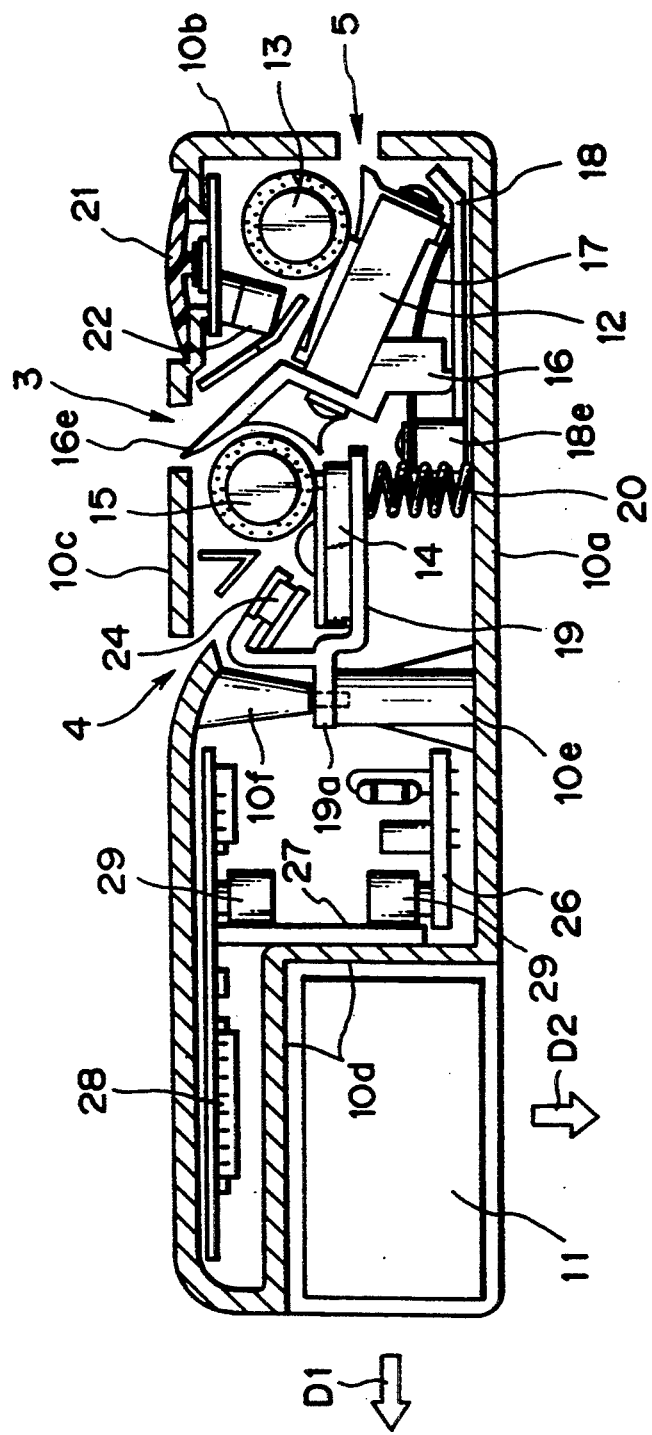
FIG. 2 is a transverse sectional view showing the facsimile apparatus of FIGS. 1A and 1B.

The internal construction of the facsimile apparatus is as shown in FIG. 2, which is a transverse cross section taken along a plane passing through one of the operating switches of the apparatus 1. The main components within the apparatus are illustrated. The case cover 2 comprises a cover bottom 10a, a cover top 10c, a cover front 10b and a battery receptacle 10d which, in combination with other portions, form a hollow case capable of accommodating various components. The cover top 10c is formed to have the first opening 3 and the second opening 4, and the cover front 10b is formed to have the exit port 5 substantially at the center thereof. The aforementioned switches are provided with a switch cover 21 performing the functions of a cover and display section.

The construction of the original reading section will now be described. A CS roller 13 serves as a first biasing roller for conveying the original G by a frictional force obtained by bringing the original G into contact with the original reading portion of a contact sensor 12. The CS roller 13 is freely rotatably supported on two sides obtained by bending up a base plate 18 made of metal or the like.

The CS roller 13 is biased at all times with respect to the reading portion of the contact sensor 12. Specifically, the contact sensor 12 is secured to a sensor base plate 16 rockably supported on the metal base plate 18. The combination of the sensor base plate 16 and contact sensor 12 are biased at all times toward the side of the CS roller 13 by a spring 17 one end of which is fixed to a stud 18e provided as an integral part of the metal base plate 18. The sensor base plate 16 has the transverse sectional shape shown in FIG. 2. The sensor base plate 16 is formed to have a sharp tip 16e for guiding the original G, the tip 16e being shaped to conform to the outer circumferential surface of a TPH roller 15 of a recording section, described later. Thus, the sensor base plate 16 is designed to guide a cut sheet to the first opening 3 and to allow the sheet to be torn off at the sharp tip 16e.

The construction of the recording section will now be described.

The aforementioned metal base plate 18 freely rotatably supports the TPH roller 15, which is a second biasing roller for conveying the cut sheet K1 of thermosensitive recording paper. The TPH roller 15 conveys the cut sheet K1 by a frictional force obtained by bringing the cut sheet K1 into contact with the recording portion of a thermal head 14. To bring the cut sheet K1 into contact with the recording portion, the TPH roller 15 is in a state in which it is constantly biased with respect to the recording portion of the line thermal head 14. In order to attain this state, the line thermal head 14 is secured to a thermal head plate 19, as shown in FIG. 2. The thermal head plate 19 is retained, at a hole 19a provided therein, between a stud 10f projecting downward from the underside of the second opening 4 and a stud 10e projecting upward from the cover bottom 10a. Thus the thermal head plate 19 is capable of rocking freely and is prevented from falling off. The plate 19 is in a state in which it constantly biases the recording portion of the line thermal head 14 toward the side of the TPH roller 15 by means of a coil spring 20 retained in a compressed state between the underside of the plate 19 and the metal base plate 18.

In order to place the CS roller 13 and TPH roller 15 in the constantly biased state and drive each roller with a small load and lower torque, the coefficient of friction of each roller with respect to the reading portion of the contact sensor or the recording portion of the line thermal head preferably should be set to be smaller than the coefficient of friction of each roller with respect to the original or recording paper. Accordingly, a special material rather than ordinary rubber is used on the outer circumferential surface of the CS roller 13 and TPH roller 15.

As for the electronic boards which implement the facsimile function, a chip substrate 28 on the surface of which various components such as an LSI chip and IC chip are mounted and a discrete substrate 26 on which such components as a resistor, capacitor and diode are mounted via a reflow solder bath are arranged along the upper and lower walls of the case. These boards are connected via a connector board 27. By adopting this arrangement, the process for manufacturing the boards can be simplified and available space is not wasted.

The battery receptacle 10d is provided with a chargeable-type battery 11 capable of being loaded and unloaded in the directions of arrows D1, D2. The chargeable battery 11 can be a nickel-cadmium cell or lithium-type secondary capable of producing a high-power output. An ordinary disposable battery may be employed of an adaptor for obtaining power from the cigarette lighter of an automotive vehicle may be attached.

In the arrangement described above, and as illustrated in FIG. 1B, the original G having the printed side Ga is inserted, with the side Ga facing down, into the first opening 3 in the direction of arrow A1 so as to be read in the reading section, after which the original is discharged from the apparatus via the exit port 5. The pre-cut sheet K1 of thermosensitive recording paper is inserted via the second opening 4 in the direction of arrow B1, whereupon the cut sheet is recorded upon. The cut sheet K1 is then discharged from the first opening 3 in the direction (upward) indicated by arrow B2. Thus, the facsimile apparatus 1 is capable of performing an operation for reading an original and a recording operation in units of the cut sheets of paper, i.e., one cut sheet at a time.

Figure 3:
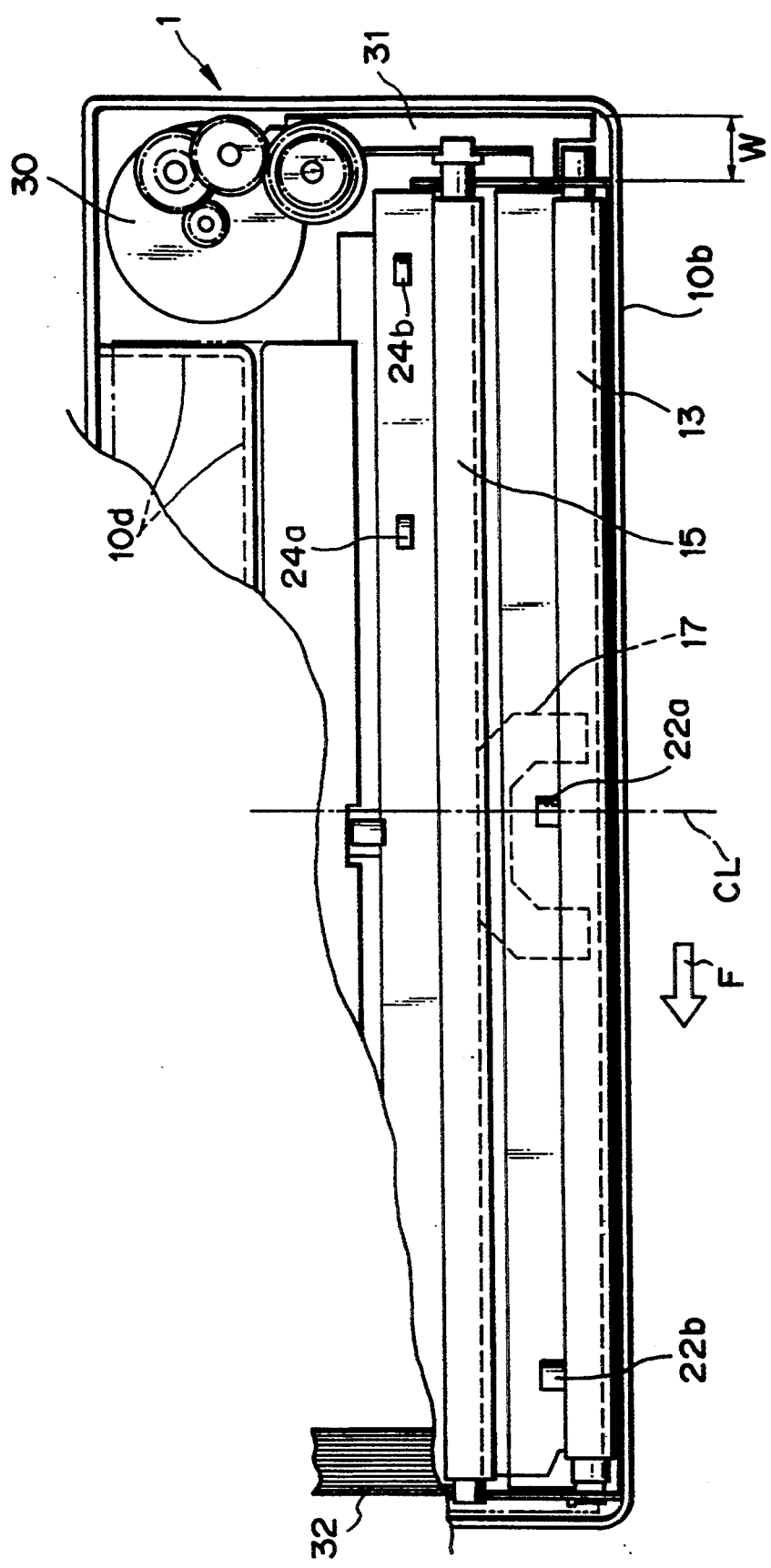
FIG. 3 is a plan view showing the compact facsimile apparatus of this embodiment.

FIG. 3 is a plan view illustrating the compact facsimile apparatus 1. This shows the manner in which the reading section and the recording section are provided offset to the left side (in the direction of arrow F) relative to a center line CL of the apparatus. The reading section and the recording section in FIG. 3 will now be described, with these sections being represented by the positions at which the CS roller 13 and TPH roller 15 are disposed. The center position of each of the rollers 13, 15 is offset to the left side (in the direction of arrow F) relative to the center line CL. This provides a space of width W within the case of the apparatus. By providing a gear train 31 in this space, it is possible to transmit the driving force of a pulse motor 30, which is the driving source of the rollers.

The reading section is provided with DES sensors 22a, 22b for detecting whether originals of different sizes are present or not, and the recording section is provided with RPS sensors 24a, 24b for detecting whether recording paper of different sizes is present. The positions of these sensors are as illustrated.

Figure 4:
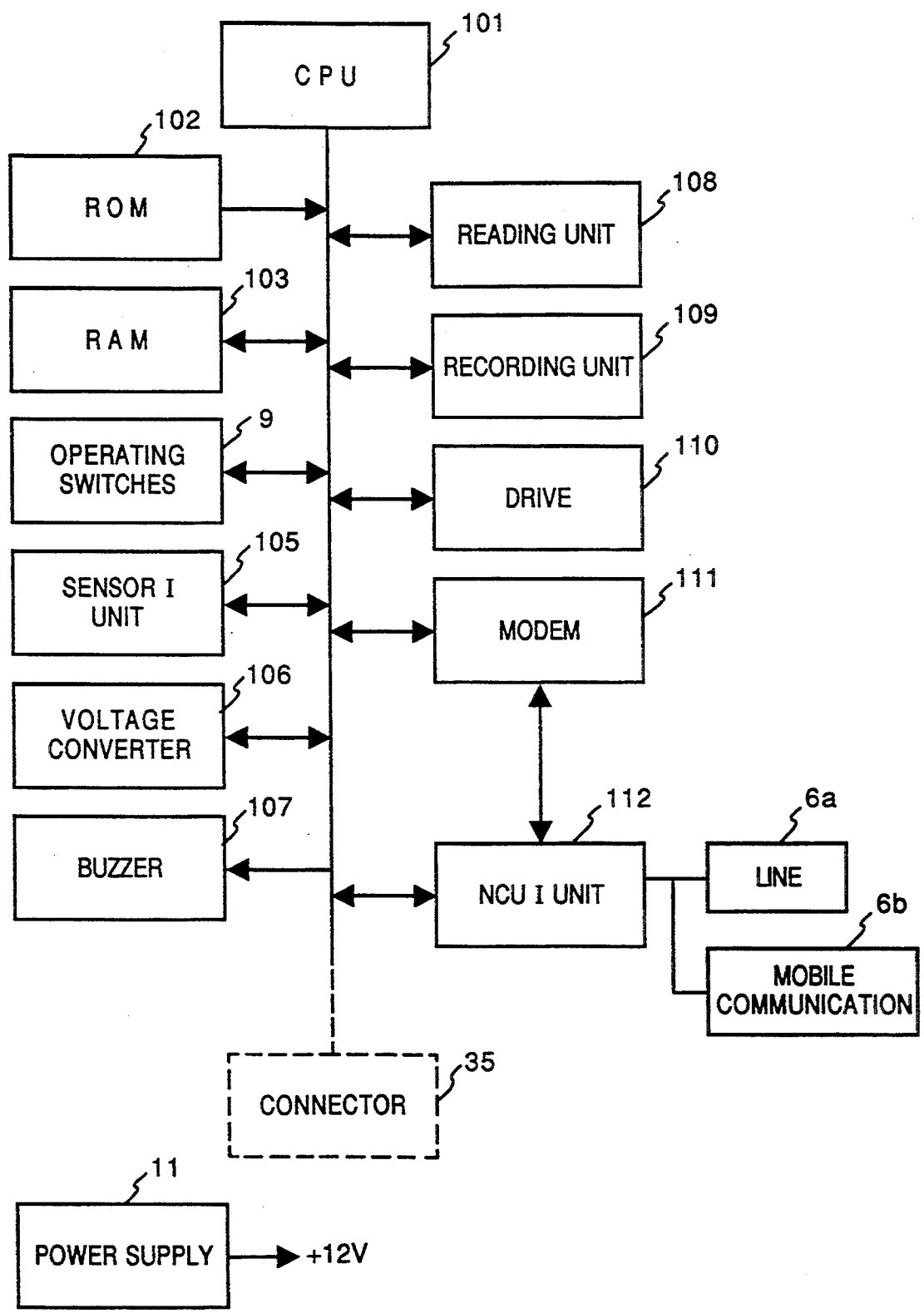
FIG. 4 is a block diagram showing the compact facsimile apparatus of the embodiment.

FIG. 4 is a block diagram illustrating the compact facsimile apparatus. As shown in FIG. 4, various components are connected to a CPU 101. These components are a ROM 102, a RAM 103, the operating switches 9, a sensor unit 105 comprising the DES sensor 22 and the RPS sensor 24, a voltage converter 106 for obtaining a voltage of 5 V from a power-supply voltage (12 V) provided by the chargeable battery (power source) 11, a buzzer 107 for informing the user of operating status, a reading unit 108 for processing a read signal from the contact sensor 12, a recording unit 109 for outputting a recording signal produced by the line thermal head 14, a drive unit 110 for driving the pulse motor in the prescribed manner, a MODEM 111 for converting the line signal, and an NCU 112 connected to the connector 6a, which is for connection to the telephone line, or to the connector 6b, which is for a mobile telephone.

A connecting unit 35 indicated by the dashed line is a connector for external connection in a case where the apparatus 1 is provided with additional functions. This unit is provided on the connector board 27 mentioned earlier.

In the arrangement set forth above, there is a receiving mode and a transmitting mode, the operations of which will be described with reference to the flow-charts of FIGS. 5 and 6.

Figure 5:
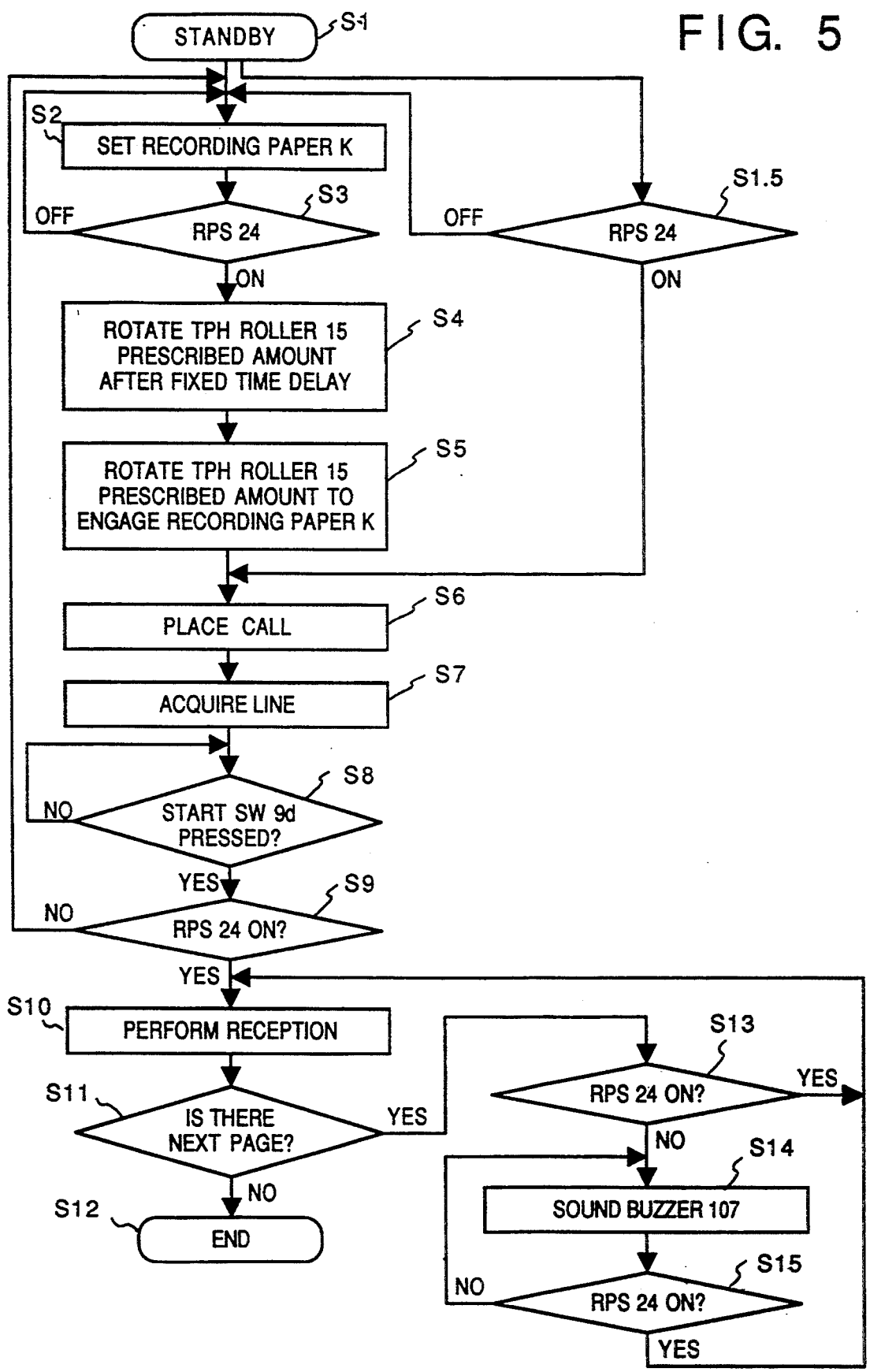
FIG. 5 is a flowchart of a receiving mode.
Figure 6:
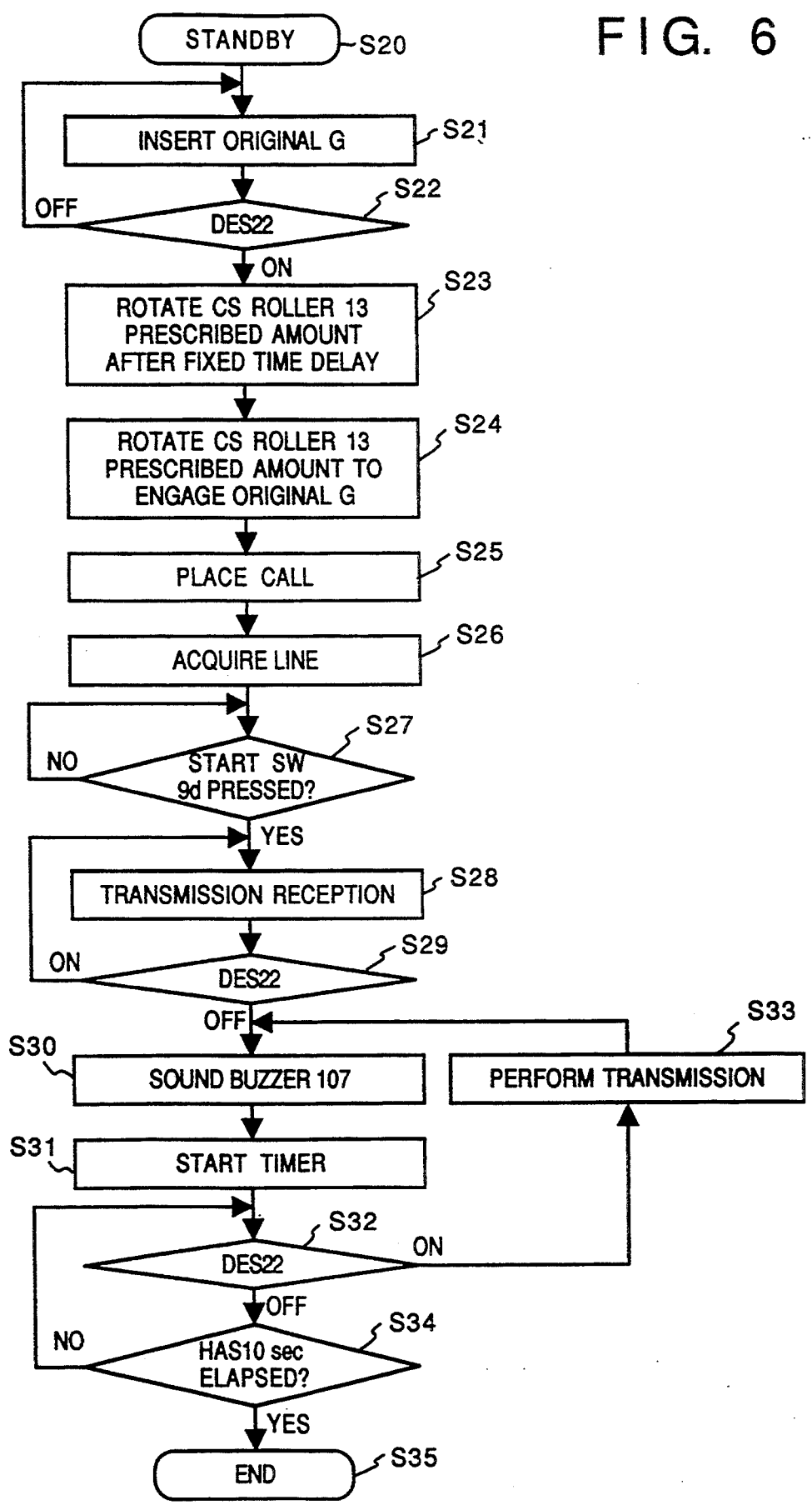
FIG. 6 is a flowchart of a transmitting mode.

In FIG. 5, processing proceeds to a step S1.5 in from a standby state at step S1. If the recording paper is found at step S1.5 to have been already set in place, then the RPS sensor 24 turns on and processing proceeds to step S6. In the absence of recording paper, the RPS sensor is turned OFF and the program proceeds to step S2, at which the recording paper K (the pre-cut sheet K1 or the roll paper K2) is set. Step S2 is followed by step S3, at which the RPS sensor 24 senses whether or not the recording paper K is present. If the sensor is ON, then the program proceeds to step S4. Here, upon elapse of a prescribed period of time, the TPH roller 15 is rotated a fixed amount to feed the leading edge of the recording paper K into the gap between the roller 15 and the line thermal head 14, whereby skewing of the recording paper K is eliminated.

Next, at step S5, the TPH roller 15 is rotated a prescribed amount so that recording paper K is placed in a state in which it can be recorded on. A call is placed to the transmitting side at step S6, after which a line is acquired at step S7 and the start switch 9d is pressed at step S8. The program then proceeds to step S9, at which the RPS sensor 24 senses whether or not the recording paper K is present. If the sensor is ON, the apparatus makes a transition to a receiving operation at step S10. When the recording operation is completed, the program proceeds to step S11, at which it is determined from the transmitting side whether the next page is present. If the decision rendered is NO, the receiving operation is completed (step S12).

If the next page from the transmitting side is present, the program proceeds to step S13, at which the apparatus waits for the setting of the second sheet of recording paper K. Whether or not the recording paper K is present is sensed by the RPS sensor 24. If the sensor is ON, the program proceeds to step S10 and the receiving operation is executed. If the RPS sensor 24 does not attain the ON state even upon elapsed of a prescribed period of time, then the program proceeds to step S14, at which the buzzer 107 is actuated to prompt the user to set the recording paper in place. Next, when the recording paper K is set and the RPS sensor 24 attains the ON state at step S15, the program proceeds to step S10 and the receiving operation is executed. An operation similar to the foregoing is repeatedly executed to receive the prescribed number of pages.

Operation in the transmitting mode will now be described with reference to the flowchart of FIG. 6.

In the transmitting mode, processing proceeds to a step S21 from the standby state at step S20 when the operating switch 9d is pressed. The original G is set in place at step S21. Next, the program proceeds to step S22, at which the DES sensor 22 senses whether or not the original G is present. Processing proceeds to step S23 if the sensor 22 is ON. Here, upon elapse of a prescribed period of time, the CS roller 13 is rotated a fixed amount to feed the leading edge of the original G into the gap between the roller and the contact sensor 12, whereby skewing of the original G is eliminated and calibration is performed.

Next, at step S24, the CS roller 13 is rotated a fixed amount to place the original G in a state in which it can be read. A call is placed to the transmitting side at step S25, after which a line is acquired at step S26 and the start switch 9d is pressed at step S27. The program then proceeds to step S28, where a transition is made to the transmitting operation. Whether or not the trailing edge of the original G is present is determined at step S29. If the trailing edge is absent, the transmitting operation is completed (step S29).

The program proceeds to step 30 at the end of transmission. At this step the buzzer 107 is actuated to prompt the user to set the next original G in place. This is followed by step S31, at which an internal timer is started, and then by step S32. When the DES sensor 22 attains the ON state, the program proceeds to step S33, at which the transmitting operation is executed. If the DES sensor 22 remains in the OFF state for a fixed period of time at step S32, then it is judged that there is no next original and operation is concluded at step S35.

Figure 7A:
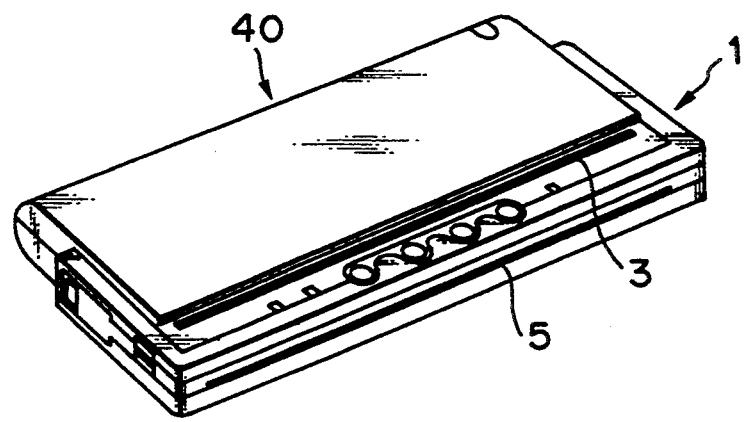
FIG. 7A is an external perspective view showing the compact facsimile apparatus of FIG. 1 after being combined with the roll-sheet holder.
Figure 7B:
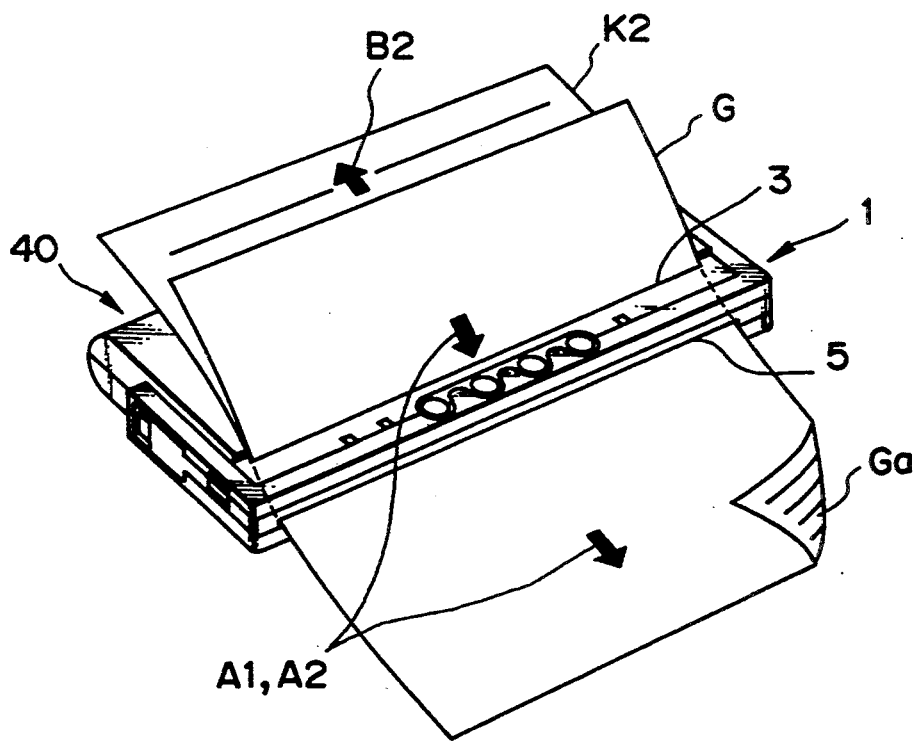
FIG. 7B is an external perspective view showing the apparatus of FIG. 7A in use.

FIG. 7A is an external perspective view showing the ultracompact facsimile apparatus 1 of FIG. 1 after it is combined with a roll-sheet holder 40, and FIG. 7B is an external perspective view showing the facsimile apparatus in use after being combined with the roll-sheet holder 40. In FIG. 7A, the facsimile apparatus 1 is provided with a roll-sheet holder 40 consisting of a heat-resistant resin material and capable of being attached and detached at will. When the holder 40 is combined with the facsimile apparatus 1 as shown in FIG. 7A, the aforementioned switches, the first opening 3 and the external connector 6 are exposed.

When the facsimile apparatus 1 and holder 40 have been combined, the original G is inserted, with its printed side Ga faced down, from the first opening 3 and then is conveyed out from the exit port 5 in the direction of arrows A1, A2, as shown in FIG. 7B. A roll K2 of recording paper, which is obtained by rolling up a thermosensitive paper, is conveyed/discharged from below the first opening 3 to the exterior of the apparatus in the direction of arrow B2.

FIG. 8A is a transverse sectional view showing the roll-sheet holder, and FIG. 8B is a sectional view seen an along the arrow in FIG. 8A. As shown in FIG. 8A, the roll-sheet holder 40 includes a base portion 44 for accommodating the roll sheet K2, which is wound about a core KT, and mounting means 46 obtained by extending the right edge portion of the base 44. One side of a hinge 48 is fixed to the left edge (rear end) of the base portion 44, and a cover 45 having its end portion 45b secured to the other side of the hinge 48 is capable of being opened and closed freely in the direction of arrow H1. The cover 45 has a tip portion 45a of sufficient length in order to cover the second opening 4 of the facsimile apparatus 1. The cover 45 is formed to have a stopper 50. The cover 45 is capable of being held in the closed state by engaging the stopper 50 with the second opening 4.

A fixing screw 43 having a knurled portion is provided in the mounting portion 46 and is partially exposed so that it can be turned by a finger. The upper part of the mounting portion 46 is provided with a bearing 42 rotatably supporting an alignment roller 41, which prevents the roll paper K2 from meandering or becoming skewed. The alignment roller 41 also guides the roll paper K2 between itself and the second opening 4 in a state spaced away from the upper side of the compact facsimile apparatus 1.

The alignment roller 41 has a drum-shaped configuration, as shown in FIG. 8B, in which the diameter E1 at the central portion is greater than the diameter E2 near the ends. As will be set forth later in connection with FIG. 12, tension is concentrated along the center line of the roll paper K2 by the alignment roller 41 so that the paper can be prevented from meandering or becoming skewed. Since the roll paper K2 can be guided while spaced away from the upper surface of the compact facsimile apparatus 1, the recording surface of the paper is prevented from being damaged.

Figure 9A:
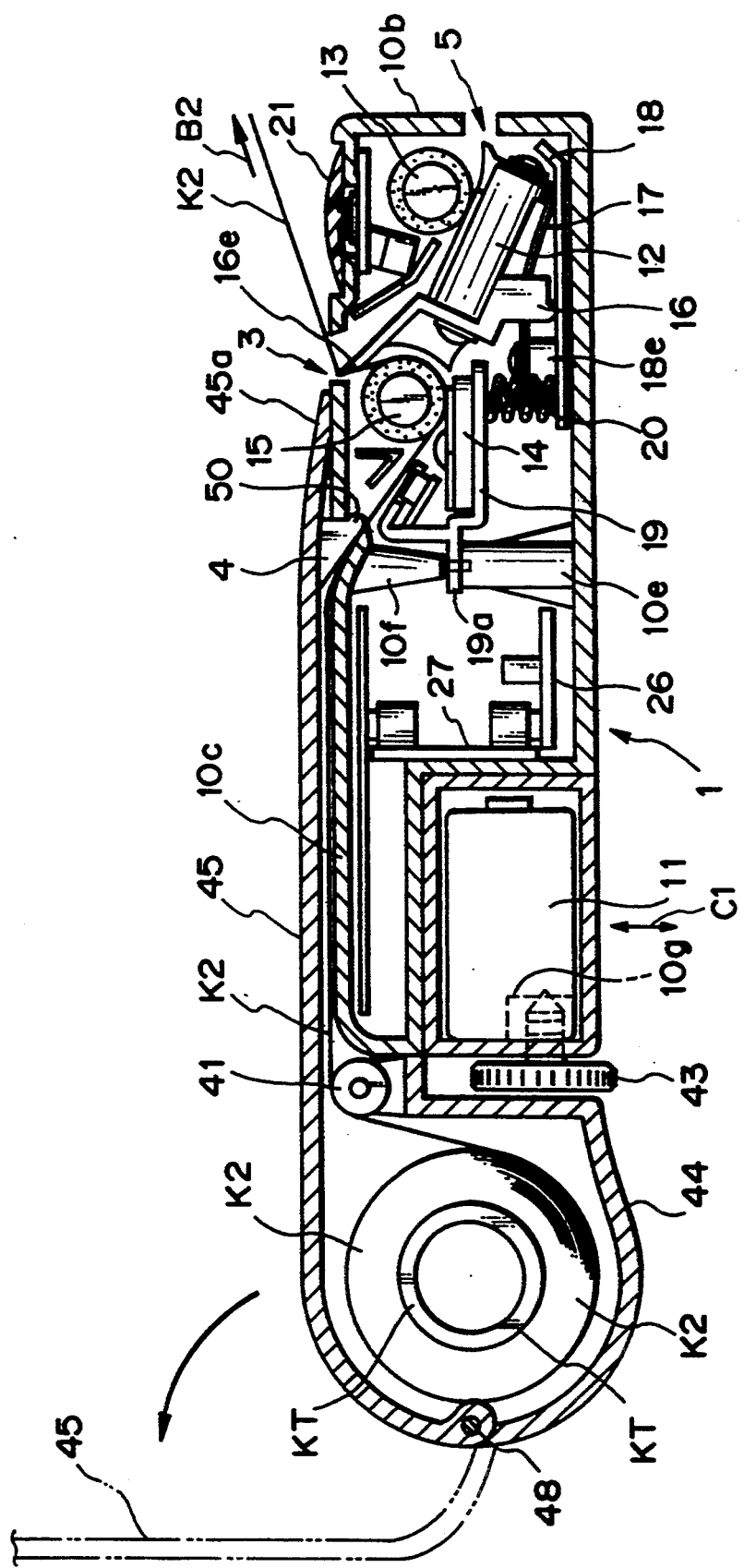
FIG. 9A is a transverse sectional view showing the compact facsimile apparatus after being combined with the roll-sheet holder.

FIG. 9A is a transverse sectional view showing the roll-sheet holder 40 and the compact facsimile apparatus 1 after being combined. The manner in which the roll paper K2 is torn off is illustrated. Portions in FIG. 9A that have already been discussed are designated by the same reference characters and need not be described again. A mounting screw 10g, which is indicated by the dashed line, is provided on one side or on both sides of the chargeable batter 11. The fixing screw 43 is capable of being turned freely to mount and fix the holder 40. The cover 45 is held by a rotary shaft 48, instead of the hinge mentioned earlier, so as to be capable of turning freely. The cover 45 may be opened to the position indicated by the two-dot chain line in FIG. 9A.

In the state described above, the roll paper K2 is inserted from the second opening 4 upon being passed above an upper cover plate 10c and the is passed below the circumferential surface of the TPH roller 15 of the recording section, after which the roll paper K2 is moved along the sharp portion 16e of the sensor base plate 16 and out via the first opening 3. If the roll paper K2 is pulled in the direction of arrow B2 in FIG. 9A, it can be torn off at the sharp portion 16e.

When consumption of the roll paper K2 advances, the outer diameter of the roll approaches the diameter of the core KT and the paper may curl up. In the prior art, this can cause the roll paper K2 to penetrate into the recording section again from the second opening 4 after recording. With the arrangement of this embodiment, however, this can be prevented since the opening is closed off by the cover 45. When the roll paper K2 is to be replaced, the cover 45 is opened to the position indicated by the two-dot chain line, after which the old roller paper K2 and core KT are removed and replaced.

Further, if it is desired to use pre-cut paper, such as when the roll paper is used up, the roll-sheet holder 40 need not be detached from the compact facsimile apparatus 1. Merely opening the cover 45 makes it possible to use insert pre-cut sheets from the second opening and place these sheets in a usable state.

When the rechargeable battery 11 is replaced, the battery can be replaced very simply by freely loading and unloading it in the directions of arrow C1 at the bottom of the facsimile apparatus 1 in FIG. 9A. This can be done without detaching the roll-sheet holder 40 from the facsimile apparatus 1, without detaching the cover 45 from the facsimile apparatus 1 and without taking out the roll paper K2 after opening the cover 45.

FIG. 9B shows use of the tip portion 45a, which is the blade portion of the cover 45. This diagram illustrates the manner in which the roll paper K2 is torn off near the vicinity of its leading edge. FIG. 10 is a plan view of FIG. 9B and shows the relative positional relationship between the roll paper K2 and the stopper 50 in the width direction. Since components in these two diagram have already been described, only reference characters are attached thereto and these components need not be described again.

In order to insert the roll paper K2 from the second opening and place it in a state in which it is grasped between the line thermal head 14 and the TPH roller 15, the TPH roller 15 is rotated without releasing the line thermal head 14 from the biased state. Therefore, if the leading edge of the roll paper K2 is ragged or in disorder, this will cause problems. The leading edge must be linear. In other words, if the leading edge is in disorder, not only is it difficult to insert it into the second opening 4 but trouble such as jamming within the apparatus can occur as well.

Accordingly, as shown in FIG. 9B, the sectional shape of the tip 45a of the cover 45 is formed to be sharp, the roll paper K2 is clamped between the cover 45 and the upper cover plate 10c and the paper is pulled in the direction of arrow B3, thereby making its leading edge linear.

When the roll paper is to be torn off, use is made of the stopper 50, which places the cover 45 in a state where it engages the second opening 4. The stopper 50 is so adapted that the cover 45 will not open when the roll paper is torn off. As shown by the dashed line in FIG. 10, the stopper 50 is provided at a point outside the maximum width of the roller paper K2 so as not to interfere with the paper and impede cutting.

Figure 11A:
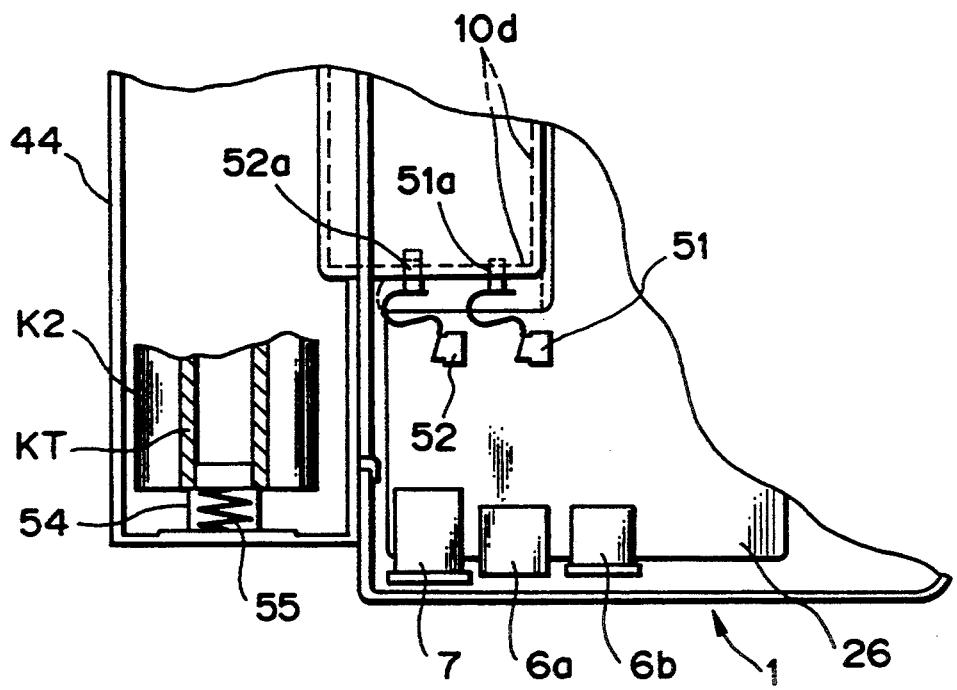
FIG. 11A is a partially enlarged plan view showing the compact facsimile apparatus.
Figure 11B:
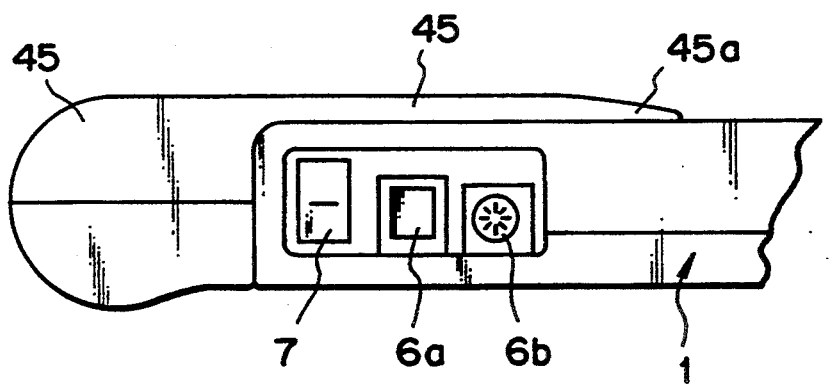
FIG. 11B is a side view of FIG. 11A.

FIG. 11A is a partially enlarged plan view of the compact facsimile apparatus 1, and FIG. 11B is a side view of the same. These diagrams show the manner in which the facsimile apparatus 1 and roll-sheet holder 40 are combined. First, in FIG. 11A, the side face of the base portion 44 of holder 40 is provided with a guide shaft 54 that receives the compression force of a coil spring 55 so as to be fitted into a small-diameter through-hole of the core KT of roll paper K2. The roll paper K2 is axially supported in a freely rotatable and exchangeable manner between this guide shaft 54 and a guide shaft (which may be fixed) provided on the other side of the base portion 44.

A switch 7 and connectors 6a, 6b are mounted on the discrete substrate 26, and battery contacts 51, 52 are mounted on the outside of the battery receptacle 10d. Contacts 51a, 52a are projectively provided and held in a biased state by the resiliency of the material of which they are formed. By being mounted in this manner, the switch 7 and connectors 6a, 6b project to the outside, as shown in FIG. 11B. If the chargeable battery 11 is set in the main body in the direction mentioned above, it can be connected so as to supply electric power.

FIG. 12 is a partial plan view showing the compact facsimile apparatus 1 and the roll-sheet holder 40 after being combined. This shows the manner in which roll paper K2 of different sizes is mounted on the base portion 44 of the roll-sheet holder 40, as well as the positional relationship of the alignment roller 41. As shown in FIG. 12, roll paper K2 of size A4 (width), indicated by the dashed line, and roll paper K2 of size B4 (width), indicated by the two-dot chain line, are capable of being mounted on the base portion of the roll-sheet holder 40. In order to make the center lines C of the two sizes coincide, spacers 53 having approximately the same overall length are set on the left and right guide shafts 54. Thus, the center lines of roll paper K2 having difference sizes are made to coincide so that the center-line position relative to the alignment roller 41 will not change. This prevents meandering and skewing of the different roll papers K2.

It should be noted that the roll-sheet holder 40 described above is applicable not only to a facsimile apparatus but also to printers using recording paper in roll form.

In accordance with this embodiment as described above, there is provided a compact facsimile apparatus in which recording paper in pre-cut sheets or in roll form can be used selectively. The apparatus is easy to use and it is easy to attach and detach the power-supply unit even if the roll-sheet holder has been combined with the apparatus. The apparatus can be constructed in a compact and flat form.

Figure 13:
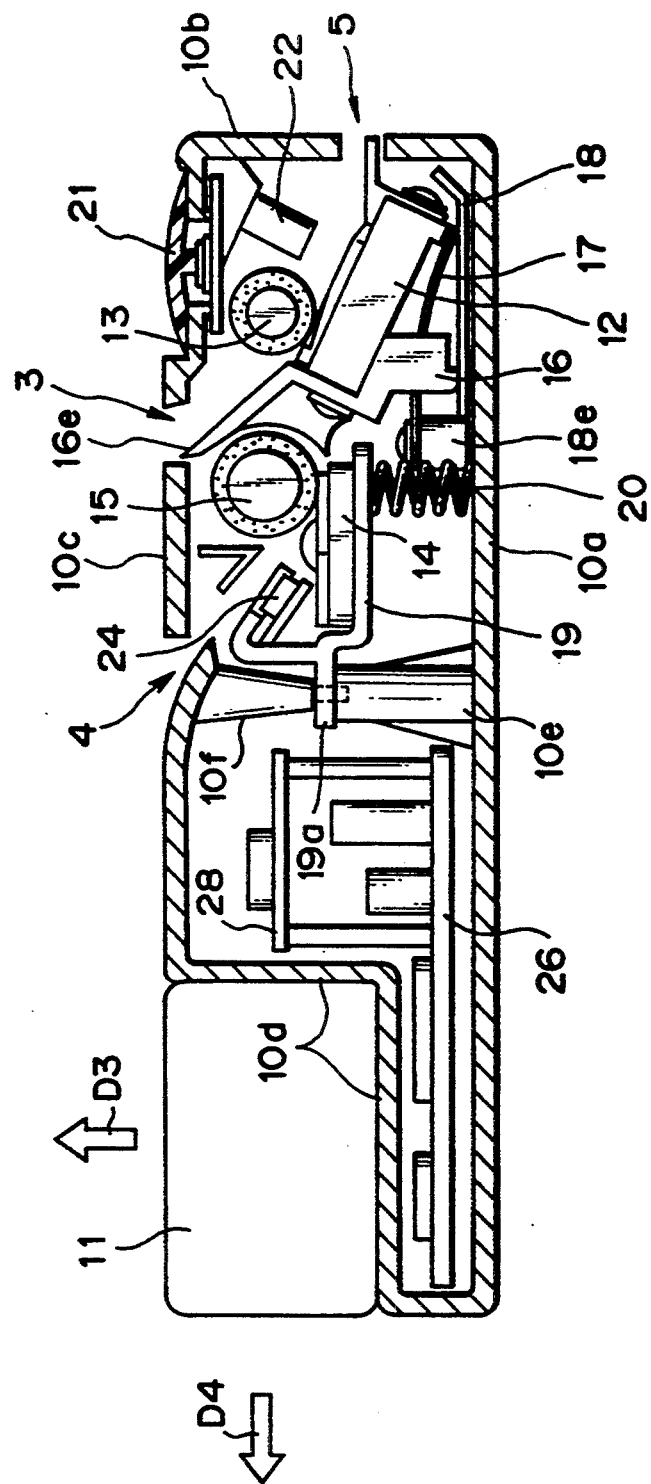
FIG. 13 is a transverse sectional view showing a portable facsimile apparatus according to a second embodiment.

FIG. 13 is a transverse sectional view illustrating a second embodiment of the portable facsimile apparatus 1. Since the construction of the reading section and recording section is substantially the same as in the first embodiment, only the portions that differ from the first embodiment will be described. In FIG. 13, the battery receptacle 10d is formed in such a manner that the upper side and underside of the case are continuous so that the rechargeable battery 11 made be loaded and unloaded in the directions of arrows D3, D4. The chip substrate 28 and discrete substrate 26 are arranged on two different levels via the intermediary of a spacer.

In this arrangement also, and as illustrated in FIG. 1B, the original G having the printed side Ga is inserted, with the side Ga facing down, into an insertion port 5 in the direction of arrow A1 so as to be read in the reading section, after which the original is discharged from the apparatus via the first opening 3. The pre-cut sheet K1 of thermosensitive recording paper is inserted via the second opening 4 in the direction of arrow B1, whereupon the cut sheet is recorded upon. The cut sheet K1 is then discharged from the first opening 3 in the direction (upward) indicated by arrow B2. Thus, the facsimile apparatus 1 is capable of performing an operation for reading an original and a recording operation in units of the cut sheets of paper.

Thus, in accordance with the present invention, as described above, a portable facsimile apparatus provided with the functions required by a facsimile apparatus is capable of being realized. Further, in the embodiment described above, a thermal head is used as the recording head. However, this does not impose a limitation upon the invention. Other recording techniques also are applicable, such as an ink-jet recording head developed by the applicant.

The effects obtained by inserting the original G from the insertion port 5 provided on the front side of the case and then discharging the original from the first opening 3 provided on the top of the case will now be described with reference to the drawings.

Figure 14A:
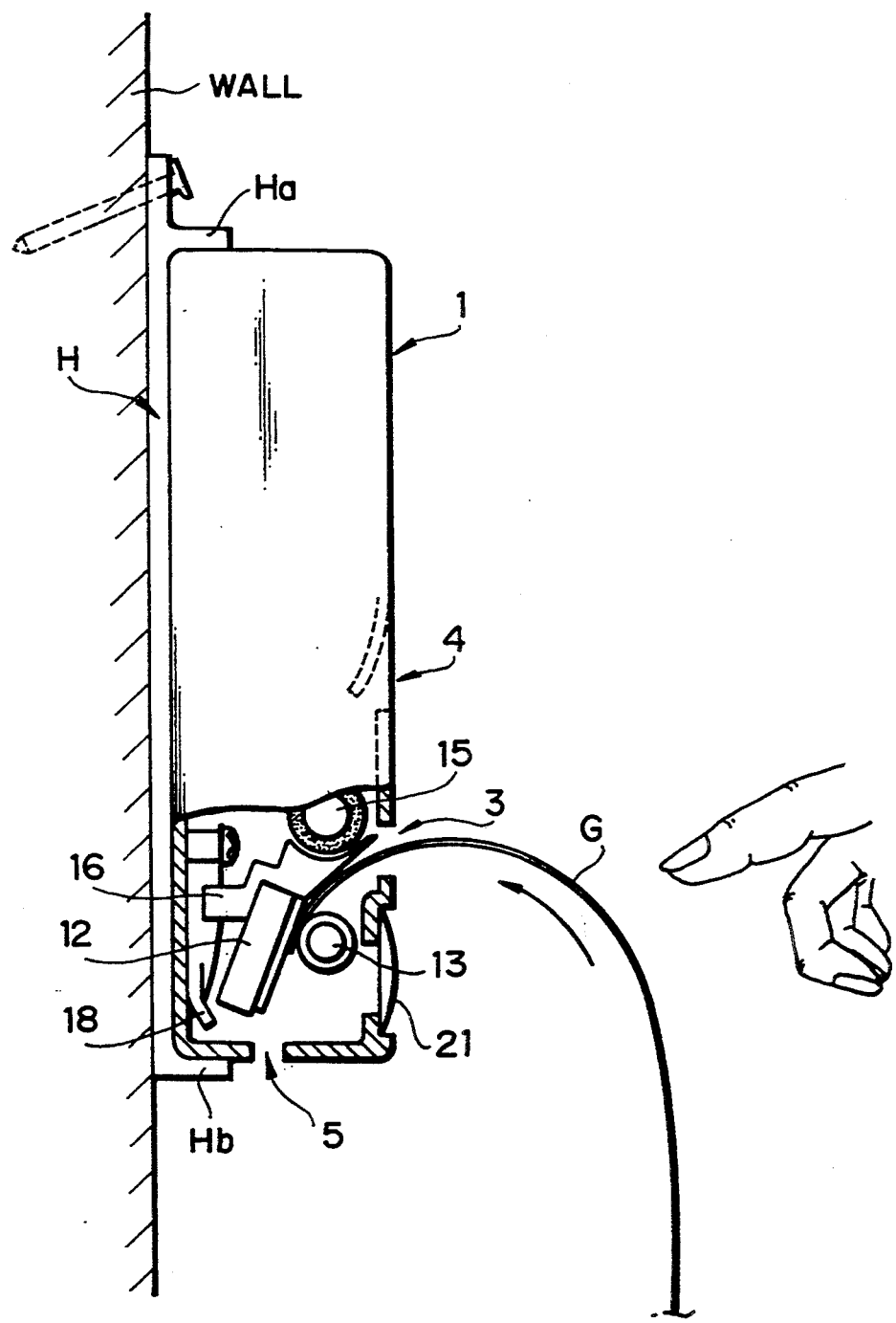
FIG. 14A is a partially broken away side view showing the portable facsimile apparatus in the form of a wall-type fax.
Figure 14B:
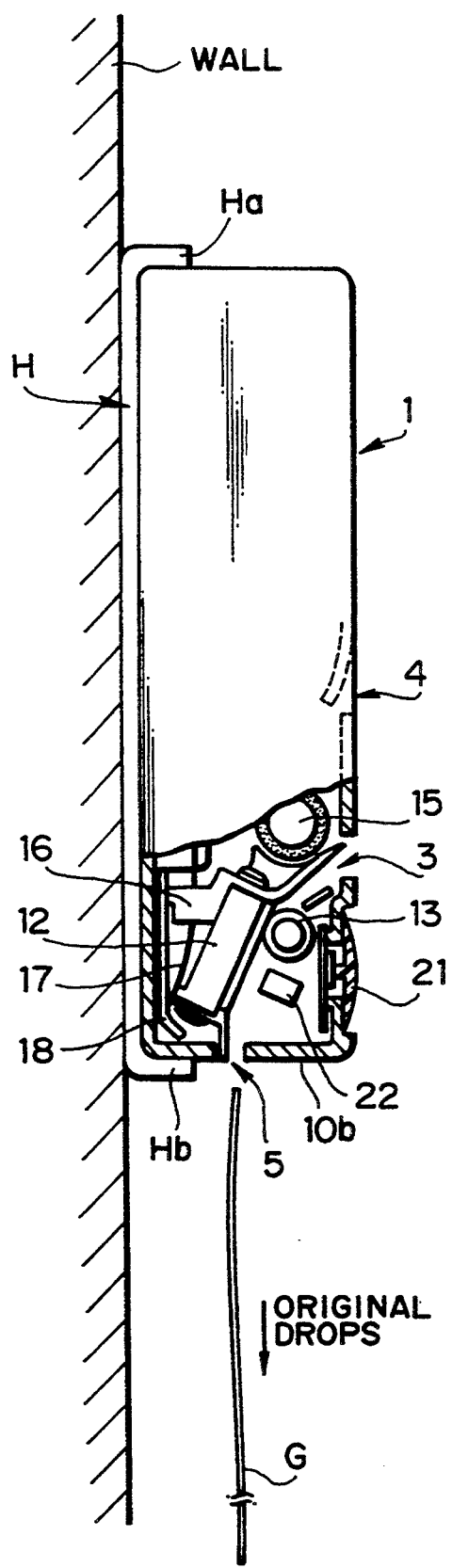
FIG. 14B is a partially broken away side view showing the portable facsimile apparatus in the form of a wall-type fax.

FIGS. 14A, 14B are partially broken away side views showing the manner in which the facsimile apparatus is mounted on a vertical wall. To this end, a special-purpose holder H is fixedly secured to the wall beforehand. The holder H is integrally formed to include engaging portions Ha, Hb at its upper and lower ends so as to approximately coincide with the vertical dimensions of the apparatus 1. With the apparatus 1 attached to the special-purpose holder H in a freely detachable manner, it is capable of being used as a so-called wall-type facsimile apparatus.

In a case where the apparatus is used as a wall-type facsimile apparatus, if the original G is inserted in the direction of the arrow from the first opening 3 provided on the top of the case and then discharged from the insertion port 5 provided on the front side of the case, the original G will hang from the apparatus under its own weight, as shown in FIG. 14A. As a result, the switch cover 21 protecting the switches is covered and concealed by the original G. This makes it impossible to operate the switches. Further, when the original G is discharged from the insertion port 5 at the end of transmission, the original drops directly out of the apparatus.

Figure 15A:
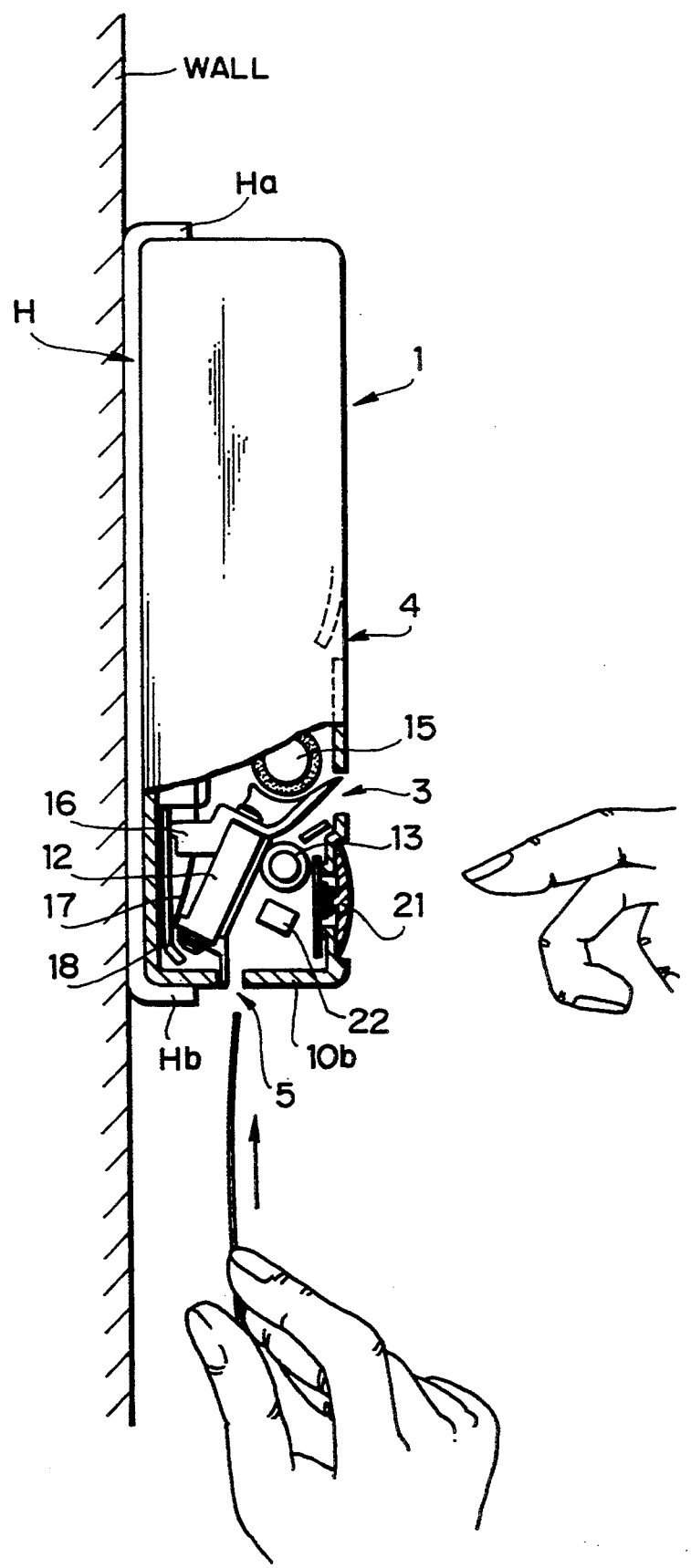
FIG. 15A is a partially broken away side view showing the portable facsimile apparatus in the form of a wall-type fax.
Figure 15B:
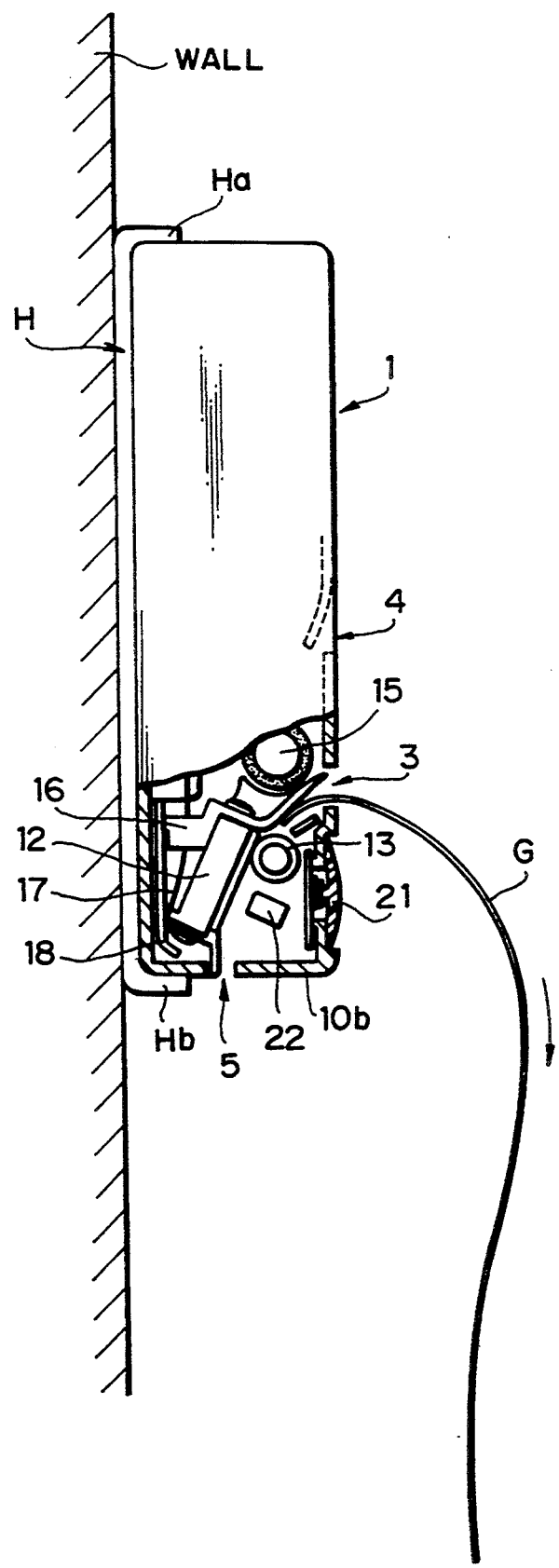
FIG. 15B is a partially broken away side view showing the portable facsimile apparatus in the form of a wall-type fax.

Accordingly, if the apparatus is used as a wall-type facsimile apparatus in the manner shown in FIGS. 15A, 15B, the original G is inserted in the direction of the arrow from the insertion port 5 provided on the front side of the case, and the original is discharged from the first opening 3 provided on the top side of the case. This makes it possible to operate the switches.

Further, when transmission ends, the original G is discharged from the first opening 3, as shown in FIG. 15B. Owing to the frictional resistance of the edge of the first opening 3 and the sensor base plate 16, the original G cannot drop directly. Rather, the original G is capable of being held in a hanging condition under its own weight.

Thus, the facsimile apparatus is capable of being used very easily when it is employed as a wall-type facsimile apparatus. When the apparatus is used in a condition placed upon a horizontal surface such as an ordinary desk, the original G can be inserted from the top side of the apparatus 1 and discharged from the front side. If there is an obstacle in front of the apparatus, however, this may impede the discharge operation and lead to a malfunction such as jamming. However, if the original G is inserted from the insertion port 5 on the front side of the apparatus and discharged from the top side, as shown in FIG. 15B, the original can be discharged without problem.

In accordance with this embodiment, as described above, there is provided a portable facsimile apparatus in which the depth dimension of the case in the longitudinal direction thereof can be reduced and pre-cut sheets can be used. In addition, the apparatus is constructed to be small and flat, and the operation for inserting and discharging an original can be performed in optimum fashion without being affected by the manner in which the apparatus is disposed.

The electronic circuit board for executing the facsimile function is composed of a discrete electronic substrate 26 and a chip substrate 28, as shown in FIG. 2. The discrete electronic substrate 26 is so arranged as to be contiguous to the bottom surface of the case body 10a. The front end of the substrate 26 extends to a position at which it will not contact and interfere with the thermal head 14. The rear end of the substrate 26 extends to the wall surface of the battery receptacle 10d, as shown in FIG. 2. Various discrete components such as a resistor, capacitor and diode are mounted via a reflow solder bath on the electronic substrate 26. These components have considerable height when mounted. The chip substrate 28 is arranged along the inner surface of the top side of the case to oppose the discrete electronic substrate 26, as shown in FIG. 2. The front end portion of the substrate 28 extends to a position at which it will not contact and interfere with the thermal head 14. The rear end portion thereof extends to the rear end of the case body through a space formed between the inner side of the top of the case and the wall surface 10d of the battery receptacle 10.

In order to fabricate a very thin facsimile apparatus, the clearance between the inner side of the top of the case and the wall surface 10d of the battery receptacle 10 should be 7 mm. Therefore, in the case of an ordinary electronic circuit board on which chip components and discrete components, for example, are mounted in mixed fashion, this circuit board cannot be provided in the clearance.

However, by mounting only components of small height, such as an LSI, an IC chip and other chip components on the chip substrate 28 and disposing this substrate so that the side having the components opposes the discrete electronic substrate 26 in the manner illustrated, the substrate can be disposed in a limited space.

Figure 16A:
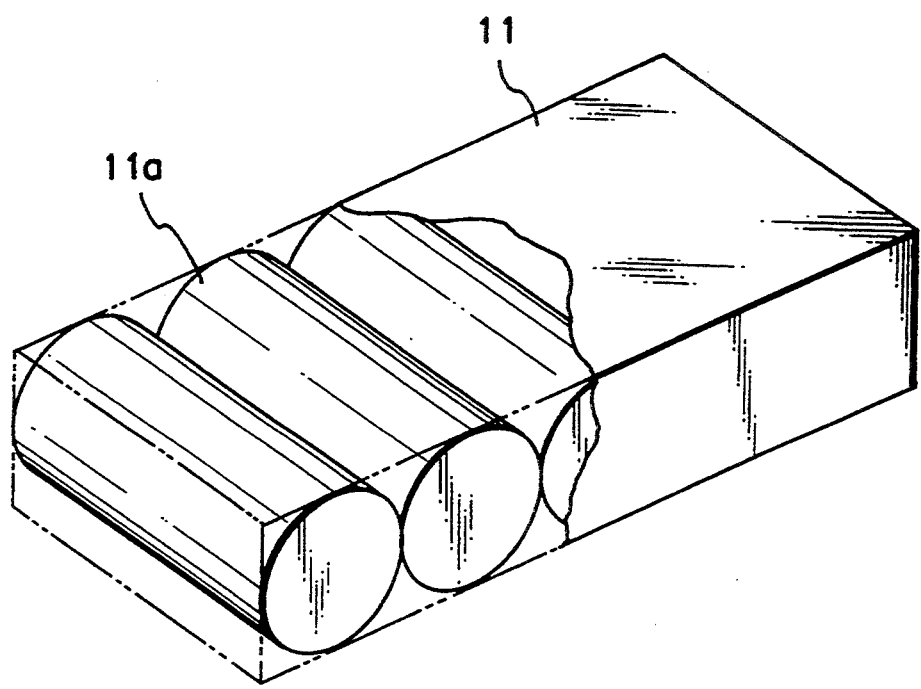
FIG. 16A is an external perspective view showing a battery.
Figure 16B:
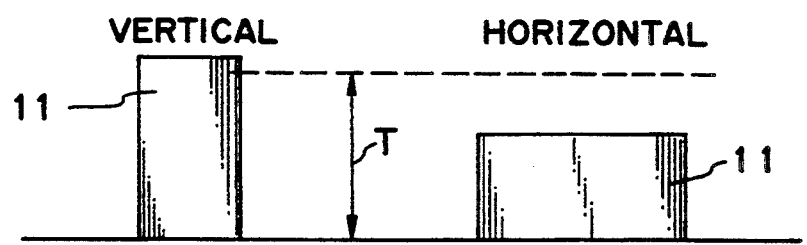
FIG. 16B is a diagram showing the battery when in use.

The substrates 26, 28 provided as set forth above are interconnected via a relay substrate 27 capable of being installed in a substantially vertical direction and removed, as shown in FIG. 2. This is one reason for providing the relay substrate. Further, as shown in FIGS. 16A, 16B, which are an external perspective view and side view, respectively, of the battery, an ordinary battery 11 is composed of a plurality of serially connected cells 11a the left and right end faces of which are provided with positive and negative contacts. The external dimensions of the battery 11 are decided based upon the size, number and arrangement of the cells for obtaining the desired current and voltage.

Since it is desired that the facsimile apparatus of the invention be constructed to be very flat and thin, as described above, it goes without saying that the battery 11 used also should be flat and thin, as illustrated. In order to realize such a flat and thin facsimile apparatus, it is desirable that the battery 11 be accommodated in the apparatus horizontally rather than vertically. The vertical arrangement is as indicated by dimension T in FIG. 16A. However, if the battery 1 is internally accommodated in the horizontal attitude, the height of the case must be made greater than the height of the battery. When this is done, however, a needless vacant space is produced above the battery. Accordingly, if the battery is installed vertically in order to eliminate the vacant space, the apparatus cannot be formed to be thin owing to the dimension T.

In view of these circumstances, the chip substrate 28 on which the components of low height are mounted, as mentioned above, has its circuitry designed so as to make effective utilization of the gap produced when the battery 11 is installed horizontally. At the same time, this makes it possible to bring the battery closer to the side of the substrate in the longitudinal direction of the apparatus, thereby making it possible to construct the overall apparatus to be thin and flat.

Thus, a single substrate is divided into two substrates having different mounting heights, and the substrates are internally disposed contiguous to the bottom and top sides of the case. As a result, the height dimension can be reduced and the limited volume of the case can be exploited without waste. This makes it possible to realize a facsimile apparatus can be constructed to be very small.

The battery receptacle 10d is provided with the chargeable-type battery 11 capable of being loaded and unloaded in the directions of arrows D1, D2. The chargeable battery 11 can be a nickel-cadmium cell, which is capable of producing a high-power output.

FIG. 17 is a plan view illustrating the portable facsimile apparatus 1. This shows the manner in which the reading section and the recording section are provided offset to the left side (in the direction of arrow F) relative to a center line CL of the apparatus. The reading section and the recording section in FIG. 17 will now be described, with these sections being represented by the positions at which the CS roller 13 and TPH roller 15 are disposed. The center position of each of the rollers 13, 15 is offset to the left side (in the direction of arrow F) relative to the center line CL. This provides a space of width W within the case of the apparatus. By providing a gear train 31 in this space, it is possible to transmit the driving force of the pulse motor 30, which is the driving source of the rollers.

Further, on the left and right sides of the battery receptacle in which the battery 11 (indicated by the dashed line in FIG. 16) is provided so as to be freely loadable and unloadable, a space A and a space B are provided, respectively, within the case. A jack 40 is provided in the space A, and a drive unit in which the pulse motor 30 is adopted as the driving source is provided in the space B.

In the prior art, the jack 40, the drive unit and the battery are arranged in the order mentioned along the depth direction of the apparatus. However, by adopting the arrangement described above, size can be reduced by the amount of the battery 11 and the accommodating spaces can be obtained.

Furthermore, by separating the drive unit and the jack 40 and placing them on the left and right sides, the wiring cables of the jack 40 can be separated from the drive unit. This prevents accidents that can be caused by contact between moving parts and the wiring cables.

The DES sensors 22a, 22b for sensing whether or not originals of different sizes are present and the RPS sensors 24a, 24b, 24c for sensing whether or not recording paper of different sizes is present are provided at the positions indicated in FIG. 17.

In accordance with this embodiment, as described above, there can be provided a portable facsimile apparatus having the functions required by a facsimile apparatus. The depth dimension longitudinally of the case can be reduced, pre-cut sheets can be used, the apparatus can be constructed so as to be small and thin, and the apparatus can be used even at locations where there is no commercial power.

Furthermore, the external dimensions of the case longitudinally and transversely can be reduced even though a battery is accommodated within the apparatus, and components can be arranged inside the case without waste.

Next, the reading section, which is a characterizing feature of this facsimile apparatus, will be described with reference to the exploded, perspective view of FIG. 18.

Figure 18:
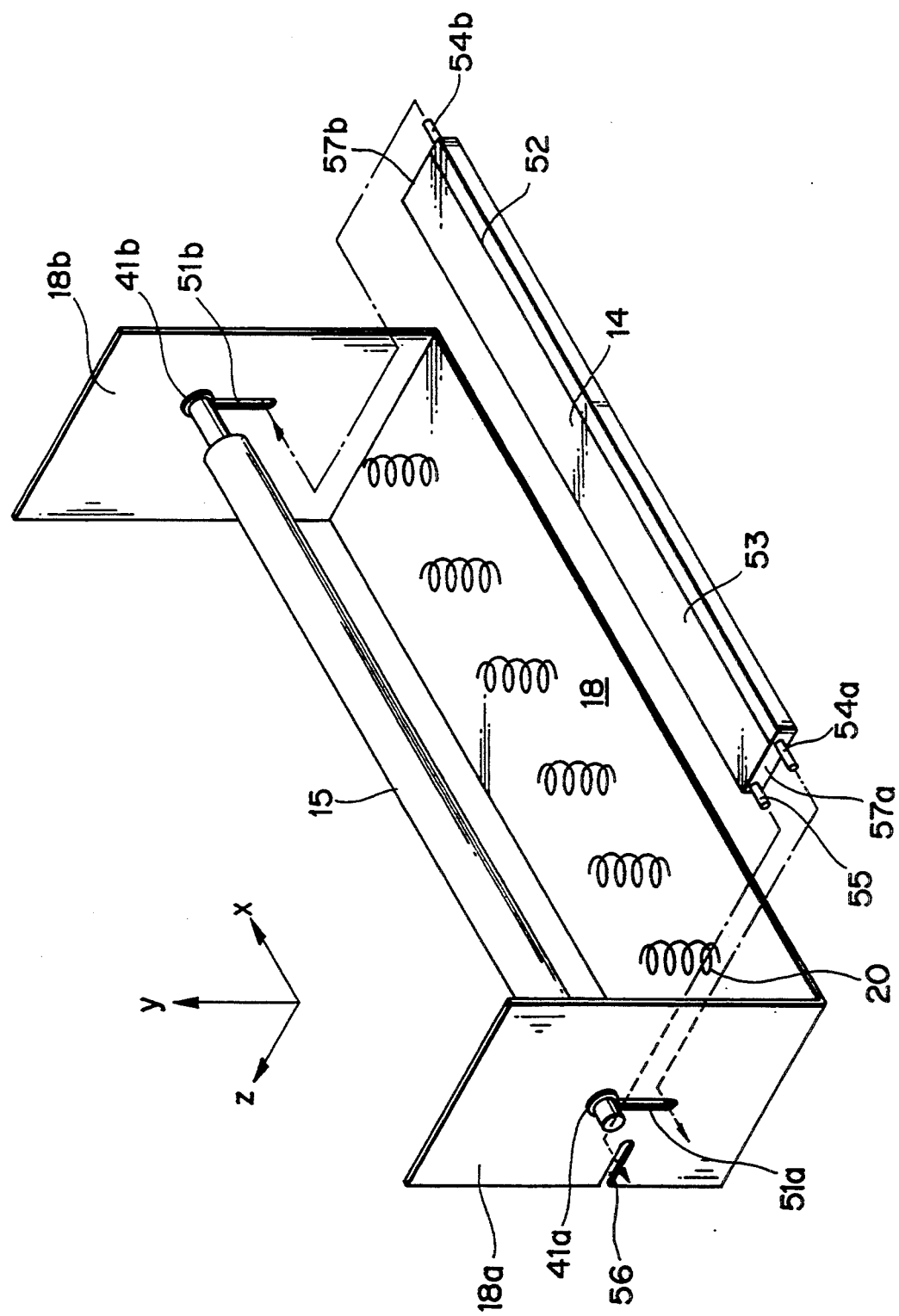
FIG. 18 is an exploded perspective view showing a line head biasing mechanism according to third embodiment of the invention.

As shown in FIG. 18, the TPH roller 15, which is the second conveyance roller for conveying the pre-cut sheets K1 of photosensitive paper, is freely rotatably supported on the metal base plate 18. It is so arranged that the pre-cut sheet K1 are conveyed by obtaining a frictional force in which the sheet K1 is brought into intimate contact with the recording portion of the line thermal head 14. In order to attain this state, the outer peripheral surface of the TPH roller 15 is constantly biased against the recording portion 52 of the line thermal head 14.

Figure 19:
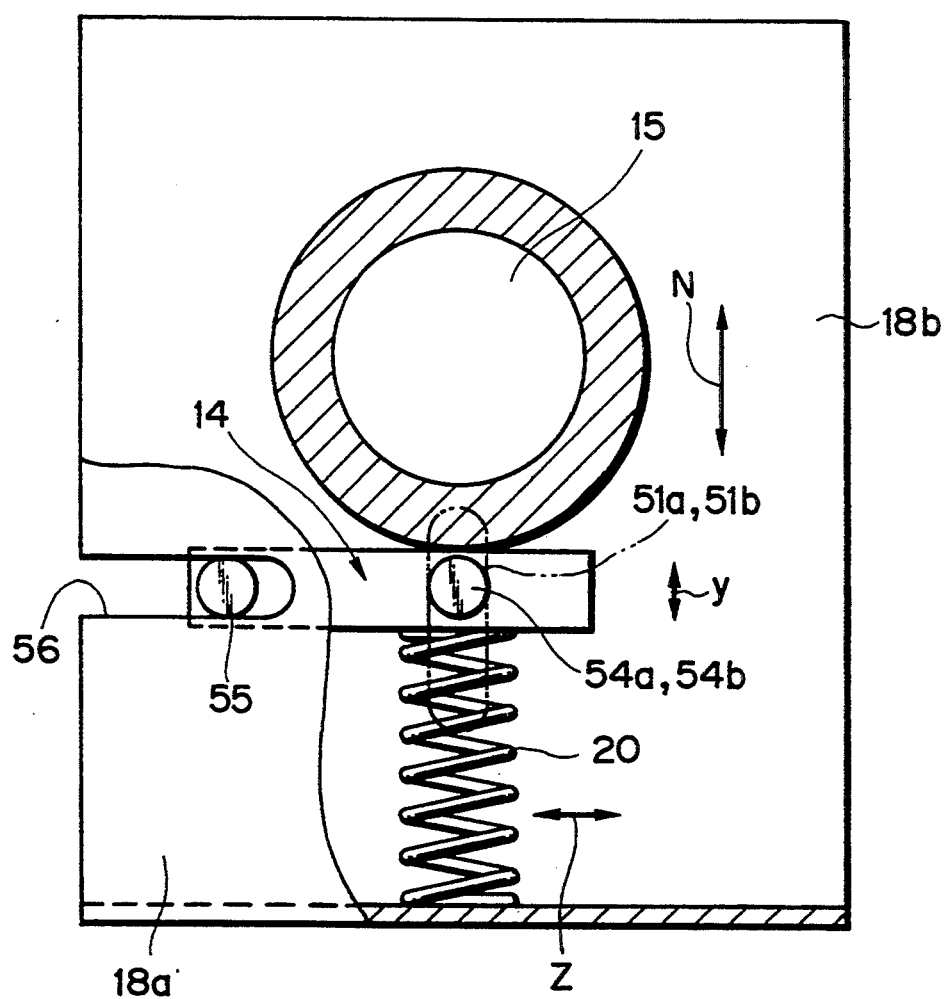
FIG. 19 is a partially broken away side view showing principal portions of FIG. 18.
Figure 20:
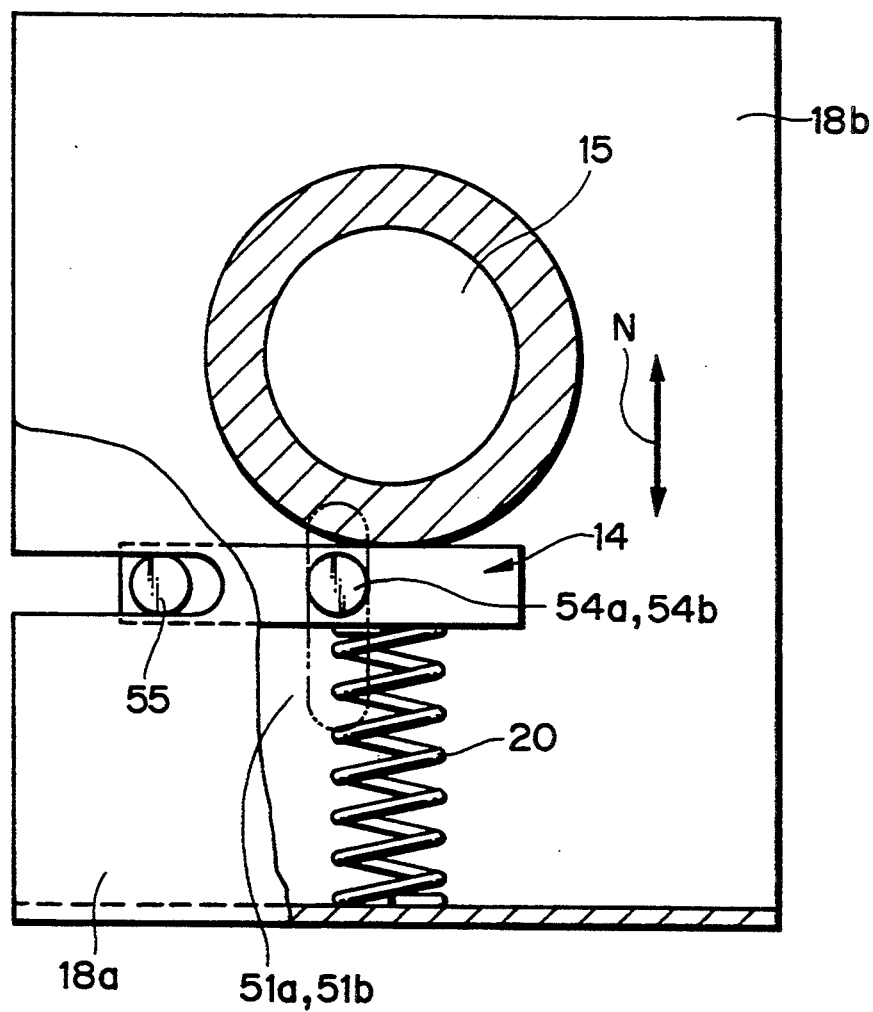
FIG. 20 is a partially broken away side view showing principal portions of FIG. 18.

A positioning mechanism for deciding the relative positional relationship between the line thermal head 14 and TPH roller 15 will be described based upon the partially broken-away side views of FIGS. 19 and 20.

As mentioned above, the TPH roller 15 is freely rotatable supported by bearings 41a, 41b fitted into side plates 18a, 18b of the metal base plate 18. The side plates 18a, 18b of the metal base plate 18 are formed to have slots 51a, 51b, respectively. The longitudinal direction of the slots 51a, 51b is the same as that of a normal line N passing through the point of tangency between the line thermal head 14 and the TPH roller 15. The center lines of the slots 51a, 51b in the longitudinal direction thereof pass through the centers of the bearings 41a, 41b, respectively, and coincide with the biasing direction of the line thermal head 14.

One end of each of the slots 51a, 51b is formed to communicate with a hole for a bearing. Printing line aligning pins 54a, 54b are provided on end faces 57a, 57b (see FIG. 22) of the line thermal head 14 in the longitudinal direction thereof and are supported by the slots 51a, 51b. As a result, the printing line aligning pins 54a, 54b are capable sliding smoothly in the slots 51a, 51b along the y direction.

The printing line aligning pins 54a, 54b are disposed so that there is less than 0.1 mm of displacement in the z direction with respect to the printing line 52 of the line thermal head 14. In other words, in a case where the printing line 52 of the heating element is urged from directly therebelow in such a manner that the line thermal head 14 is rendered parallel to the z axis, the positional relationship among the line thermal head 14, the pins 54a, 54b and the slots 51a, 51b is adjusted in such a manner that the outer circumferential surface of the TPH roller 15 will make contact with the printing line 52.

However, since the line thermal head 14 possesses a rotational degree of freedom about the printing line aligning pins 54a, 54b, the line thermal head 14 rotates owing to a variance in the biasing points and biasing direction and an external force produced by cables connected to the line thermal head 14. Thus, there is a possibility that the outer circumferential surface of the TPH roller 15 may not contact the printing line 52.

Accordingly, one end face of the line thermal head 14 is provided with a retaining pin 55, and the pin 55 is supported by a notch 56 provided in the side plate 18a, with the longitudinal direction of the notch forming a right angle with the direction in which the line thermal head 14 is urged. As a result, the turning motion of the line thermal head 14 about the pins 54a, 54b is limited. When the TPH roller 15 is biased with respect to the line thermal head 14, the printing line 52 of the line thermal head 14 and the outer circumferential surface of the TPH roller 15 contact each other stably at all times without being influenced by external forces.

The reason for providing the retaining pin 55, which limits the turning of the head 14, in only one end of the head is that when the line thermal head 14 is supported, providing support at four points is unstable in the y direction and there is a possibility that the surface of contact between the line thermal head 14 and TPH roller 15 will float. By providing sure, stable three-point support, the reliability of the positioning mechanism is enhanced.

Figure 21:
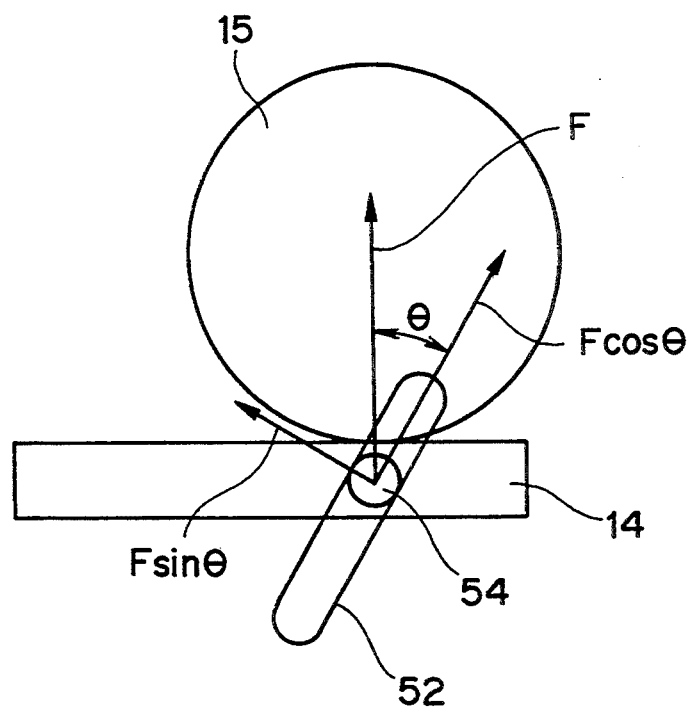
FIG. 21 is a side view for describing the operation of the third embodiment.

The reason for deciding the direction of the slots in the manner described above is as follows: First, if we let $\theta$ represent the angle defined by the direction of the urging force and the direction of the slots, the urging force of the recording portion may be resolved into its components, as shown in FIG. 21, in which F represents the urging force, $F\cos\theta$ the force for biasing the TPH roller 15 with respect to the line thermal head 14, and $F\sin\theta$ a force acting upon the portion of the slots on which the pins slide. What is ideal about this positioning mechanism is that when the recording paper has been inserted, the thermal head 14 moves smoothly in the paper pressuring direction. In addition, there is no loss of urging force.

More specifically, all of the urging force F becomes $F\cos\theta$, which is the biasing force of the line thermal head 14, and $F\sin\theta$, which detracts from the slidability of the line thermal head 14, becomes zero. The $\theta$ that satisfies this condition is 0°. This is when the urging direction and the direction of the slots coincide, as illustrated in this embodiment of the invention.

By deciding the direction of the slots in this way, loss of urging force is minimized even when an external force is applied to the line thermal head 14. Furthermore, the line thermal head 14 slides smoothly in the paper pressuring direction without the pins 54a, 54b biting in.

With reference again to FIG. 19, the direction of the notch 56 is set so that when the recording paper has been inserted, the printing head aligning pins 54a, 54b and the retaining pin 55 will slide in the slots 51a, 51b and notch 56a without biting in, and so that the line thermal head 14 will move smoothly in the paper pressuring direction. The best slidability is obtained when the direction of the notch 56 is designed to be at right angles to the urging direction.

When the above-described relative positioning mechanism is manufactured, managing the dimensions is important. Of particular importance is the relative positional relationship between the bearings 41a, 41b provided in the side plates and the slots 54a, 54b. Therefore, the holes for providing the bearings and the slots should be formed from a single member in order to minimize machining error.

Accordingly, in the above-described third embodiment of the invention, the positions of the slots 51a, 51b are determined as mentioned above. However, if the longitudinal direction of the slots 51a, 51b is made the same as that of the normal line N passing through the point of contact between the line thermal head 14 and the TPH roller 15, the same effect can be obtained by shifting the slots 51a, 51b the same amount, as illustrated in the partially cut away side view of FIG. 20.

With reference again to FIG. 18 regarding the above-described embodiment, compression coil springs 20 are held in a compressed state between the line thermal head 14 and the metal base plate 18. The line thermal head 14 is urged in the y direction by the spring force so as to bias the TPH roller 15 from directly below the printing line 52.

Further, the compression coil springs 20 are provided in a single row of six springs spaced apart substantially equidistantly. The compression coil springs 20 at both ends are situated outside positions corresponding to ordinary paper width. The total urging force is 1.5 kg. Six urging points are provided and the springs at both ends are placed outside the paper width for the following reason: In a case where a thin-type head having a low elastic modulus of bending is urged at three points and by an urging force half that of the prior art, both ends of the head will float, as mentioned earlier. In the present invention, however, support is provided at six points and urging is applied outside the width of the paper in order to prevent both ends from floating and make the head adapt itself to the TPH roller uniformly along the axial direction.

Figure 22:
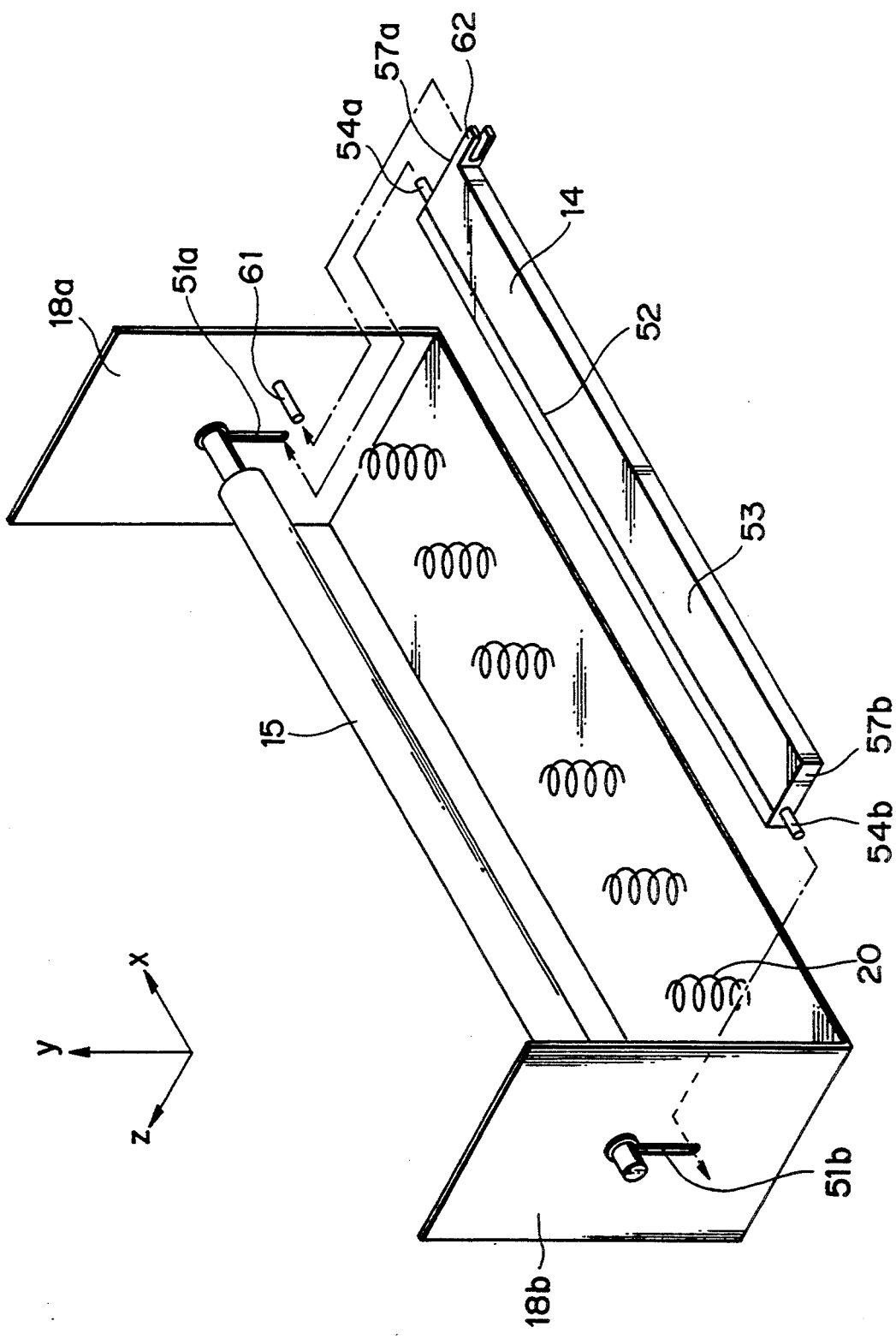
FIG. 22 is an exploded perspective view showing a line head biasing mechanism according to third embodiment of the invention.

A fourth embodiment of the invention will now be described with reference to the exploded perspective view of FIG. 22. This embodiment differs from the second embodiment as follows: In the second embodiment, the rotation of the line thermal head 14 is limited by supporting the retaining pin 55 of the head 14 in the notch 56 of the side plate. However, in this embodiment as shown in FIG. 22, a retaining pin 61 is provided on the inner side of one side plate, and a notch 62 is provided on the right end of the line thermal head 14. By mating the retaining pin 61 with the notch 62, the rotation of the thermal head is limited. This provides an effect identical with that of the first embodiment described above. Further, this effect can be obtained if the pins 54a, 54b and notch 62 are formed integral with the line thermal head 14 or as separate members.

Figure 23:
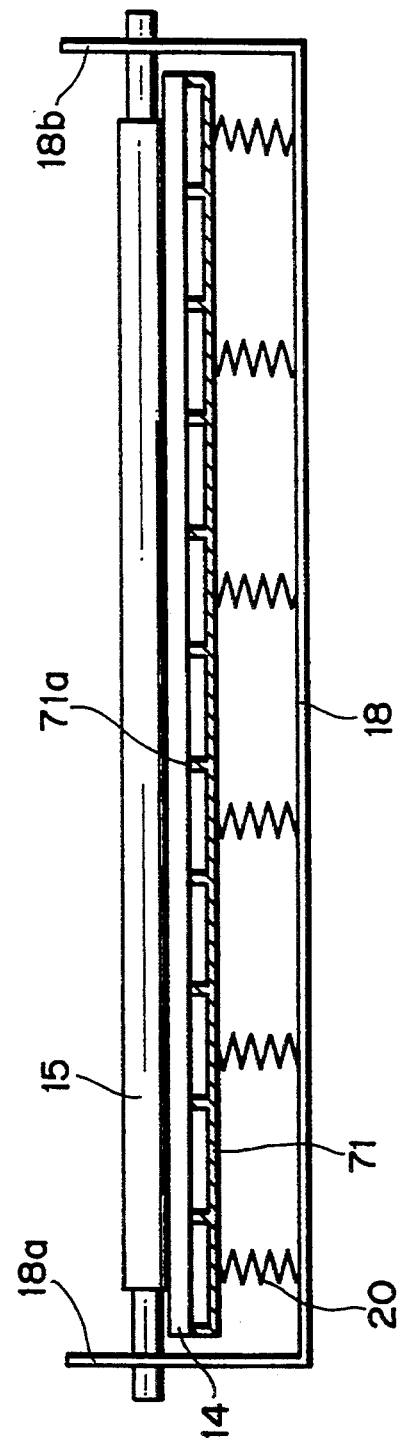
FIG. 23 is a front view of the line head biasing mechanism.

In the third and fourth embodiments, the same effects can be obtained even if the compression urging method using the springs 20 is adapted in the following manner: Specifically, as shown in the front view of FIG. 23, an intervening member 71 is arranged between the line thermal head 14 and the compression coil spring 20. A total of 12 projections 71a are provided on the side of the intervening member 71 facing the line thermal head 14. Thus, in the urged state, the underside of the line thermal head 14 is contacted at 12 locations.

By adopting this arrangement, the line thermal head 14 can be urged at a total of 12 points merely by using six compression springs 20. Further, the positions at which the outer sides of the intervening member 7 and line thermal head contact each other can be situated outside the paper width. By thus interposing the intervening member 71, the line thermal head 14 can be uniformly biased in the axial direction with respect to the TPH roller 15, and the overall printing accuracy of the printing surface can be improved.

Thus, in accordance with the line head urging mechanism of this invention, there can be provided a line head urging mechanism in which the recording section can be reduced in size in the width direction thereof. Further, the head and the conveyance roller can be brought into uniform intimate contact along the axial direction of the roller with a small urging force even when a thin-type head is used. Moreover, the mechanism can be constructed to be small in size.

Figure 24:
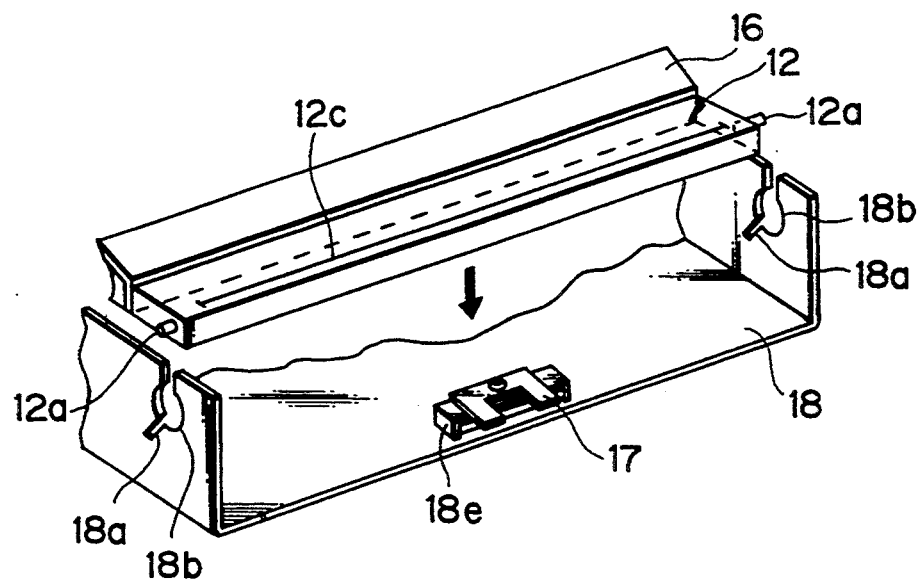
FIG. 24 is an exploded perspective view showing an embodiment of a conveyance mechanism.

The original reading section and the recording section will now be described in accordance with a exploded perspective view in FIG. 24 and the partially broken away view in FIG. 25.

The original reading section includes the contact sensor 12 as reading means for coming into direct contact with an original to read the same. The sensor 12 is similar to that of an ordinary facsimile apparatus but has a smaller transverse area. Positioning pins 12a are provided on both side faces of the sensor 12 at positions on an extension of a reading line 12c. A guide/cutting member 16, which is a characterizing feature of the invention, is secured to the sensor 12 by fixing screws 12b in the manner illustrated. With the sensor 12 and the guide/cutting member 16 integrated in this manner, the two components are attached to the metal base plate 18.

A leaf spring 17 for biasing the sensor 12 from its back side is fixedly secured by screws to a mounting portion 18e of the base plate 18 substantially at the center thereof in the width direction. As shown in FIG. 24, the metal base plate 18 is formed to have two side walls obtained by bending both ends of the plate upwardly. The two side walls are formed to have holes 18b and slots 18a, at positions of left-right symmetry, for supporting the sensor 12, the thermal head 14 and the rollers in a prescribed state. The holes 18b are for axially supporting the CS roller 13, and the slots 18a are formed so as to extend in the direction of the normal line to the holes 18b. The slots 18a are mated with the positioning pins 12a provided on the sensor 12 and position the bus of the CS roller.

Figure 25:
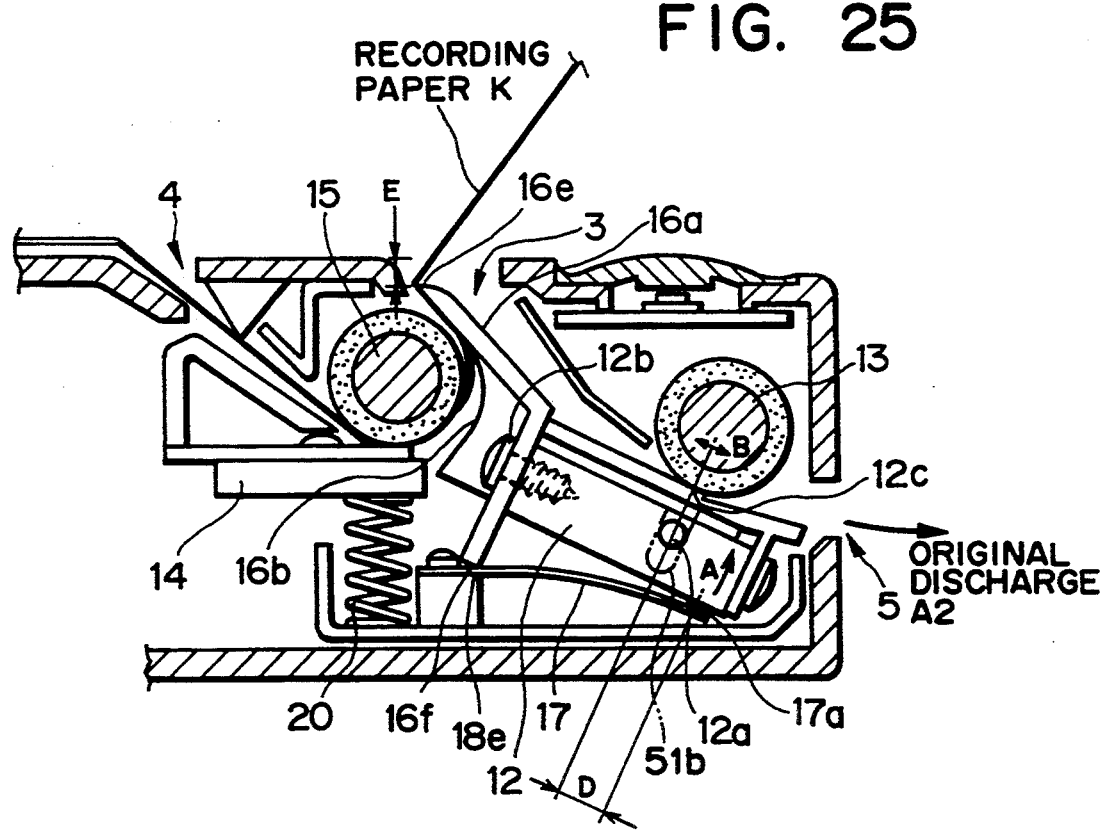
FIG. 25 is a transverse sectional view showing an embodiment of a conveyance mechanism.
Figure 26:
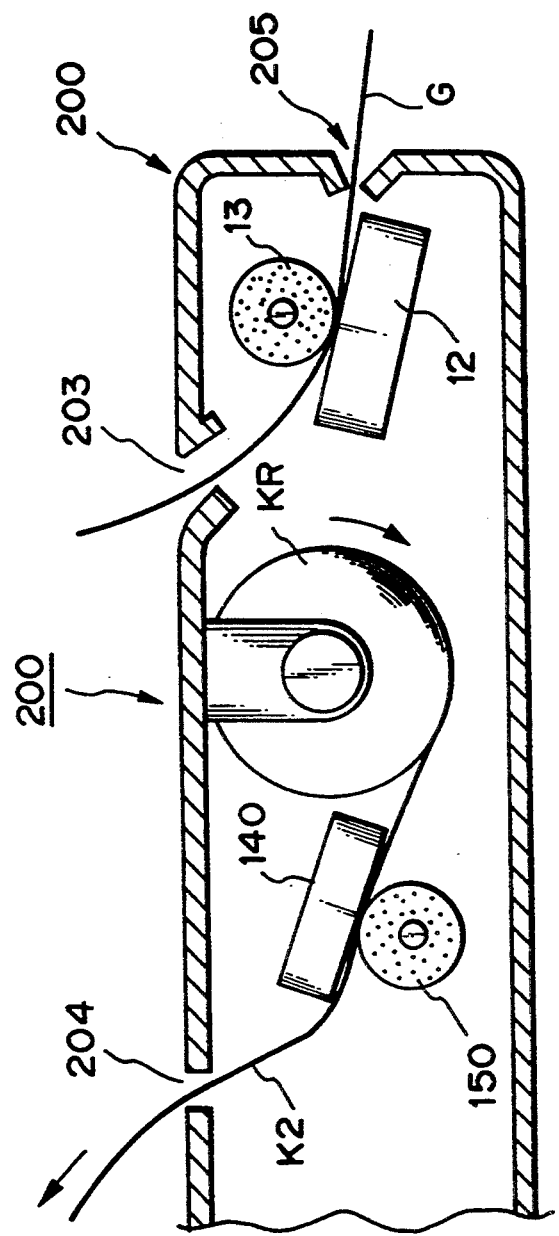
FIG. 26 is a transverse sectional view showing a facsimile apparatus according to the prior art.

When the sensor 12 is mounted on the metal base plate 18, positioning of the sensor in the direction of arrow B with respect to the CS roller 13 is decided by the relationship between the positioning pins 12a and the slots 18a, as shown in FIG. 25. As a result, the reading line 12c is biased by the biasing spring 17 in substantially the same state as that of the bus of the CS roller 13. In other words, the biasing spring 17, which has two urging points 17a, urges (see arrow A) the sensor 12 toward the side of the CS roller 13 at the two points 17a. The urging portions 17a are provided so as to shift by a distance D (e.g., 2 mm) from the reading line 12c, which is situated on the normal line extending from the CS roller 13, toward the side A2 in the original discharge direction. As a result, the sensor 12 develops a moment which rotates it in the direction of arrow A about the vicinity of the reading line 12c.

In order to decide the mounting angle of the sensor 12 in the assembled state described above, the angle of the sensor 12 with respect to the CS roller 13 is decided with the lower end portion 16f of the guide/cutter member 16 being held in abutting contact with the mounting portion 18e of the leaf spring 17 on the metal base plate 18. By virtue of this arrangement, a first function of the guide/cutter member 16 is positioning of the sensor 12, in which the reading line 12c of the sensor 12 integrally provided with the member 16 is accurately positioned with respect to the bus of the CS roller 13.

The operation of the reading section thus provided is such that first the original G is inserted into the interior of the apparatus from the opening 3 and is guided so as to move along a guiding surface 16a of the guide/cutter member 16 until it reaches an area where it is clamped between the reading line 12c and the CS roller 13. Thereafter, the CS roller 13 is driven to rotate in the counter-clockwise direction so that the original is discharged from the opening 5.

On the other hand, the recording paper K is inserted from an opening and is printed on while a prescribed printing pressure is applied between the thermal head 14 and the TPH roller 15. Thereafter, the recording paper K is guided along a guiding surface 16b of the guide/cutter member 16 so that its direction of travel is changed to the upward direction, as a result of which the recording paper is discharged from the opening 3. Thus, a second function of the guide/cutter member 16 is to serve as a guide member for originals and recording paper by virtue of its guiding surfaces 16a, 16b formed on its top and bottom sides.

Furthermore, the guide/cutter member 16 is formed to have a blade 16e, which is for cutting the recording paper, at the end thereof. At the end of the recording operation, for example, the recording paper K is conveyed by a prescribed margin and then is pulled in the direction indicated along the blade 16e. When this is done, the leading edge of the recording paper is torn off along a straight line. Furthermore, the blade 16e is provided so as to be recessed by about 1.5 mm (distance E) below the surface of the opening 3 in the case, as shown in FIG. 25. Thus, there is no danger that the operator will be injured even when the operator touches the surface of the case directly. This solves the problem of product liability (PL). Thus, a third function of the guide/cutter member 16 is that of a cutter for cutting the recording paper.

The construction of the recording section will now be described.

The TPH roller 15, which is the second biasing roller for conveying the pre-cut sheets K1 of photosensitive paper, is freely rotatably supported on the metal base plate 18. It is so arranged that a pre-cut sheet K1 is conveyed by obtaining a frictional force in which the sheet K1 is brought into intimate contact with the recording portion of the line thermal head 14. In order to attain this state, the outer peripheral surface of the TPH roller 15 is constantly biased against the recording portion of the line thermal head 14. To achieve this, the line thermal head 14 is secured to a thermal head plate 19, as shown in FIG. 2. The thermal head plate 19 is retained, at the hole 19a provided therein, between the stud 10f projecting downward from the underside of the second opening 4 and the stud 10e projecting upward from the cover bottom 10a. Thus the thermal head plate 19 is capable of rocking freely and is prevented from falling off. The plate 19 is in a state in which it constantly biases the recording portion of the line thermal head 14 toward the side of the TPH roller 15 by means of the coil spring 20 retained in a compressed state between the underside of the plate 19 and the metal base plate 18.

In order to place the CS roller 13 and TPH roller 15 in the constantly biased state and drive each roller, the coefficient of friction of each roller with respect to the reading portion of the contact sensor or the recording portion of the line thermal head preferably should be set to be smaller than the coefficient of friction of each roller with respect to the original or recording paper. Accordingly, a special material rather than ordinary rubber is used on the outer circumferential surface of the CS roller 13 and TPH roller 15.

Thus, the guide/cutter member has at least three functions, namely a function for relative positioning between the sensor and the CS roller which rotates while urged against the sensor, a guiding function for guiding both an original and a recording paper, even though the member is just one part, and a cutter function for cutting the recording paper by a blade situated within the case. This contributes to a reduction in component parts, lower cost and downsizing.

Thus, in accordance with this embodiment, the number of component parts can be reduced, cost lowered and downsizing achieved by a conveyance mechanism having such functions as a function for relative positioning between the sensor and the roller which rotates while urged against the sensor, and a guiding function for guiding both an original and a recording paper.

Further, in a facsimile apparatus constructed to be thin and compact while still having a facsimile function, the number of component parts can be reduced, cost lowered and downsizing achieved by a conveyance mechanism having at least three functions, namely a function for relative positioning between the sensor and the roller which rotates while urged against the sensor, a guiding function for guiding both an original and a recording paper, and a cutter function for cutting the recording paper.

As many apparently widely different embodiments of the present invention can be made without departing from the spirit and scope thereof, it is to be understood that the invention is not limited to the specific embodiments thereof except as defined in the appended claims.

What is claimed is:

1. A thin-type facsimile apparatus comprising:
   an apparatus main body constituting surface of said thin-type facsimile apparatus;
   a first opening formed in an upper surface portion of said main body, said first opening being provided to insert an original;
   a front surface opening formed in a front surface of said apparatus main body;
   an original transport section for transporting said original between said first opening and said front surface opening;
   an original reading section for reading said original transported by said original transport section, said original reading section is provided in a front portion of said apparatus main body, and further having a first roller which conveys said original and receives force from a reading head;
   a second opening formed in an upper surface of said apparatus main body at a position closer to a rear side than said first opening, said second opening being provided to insert a recording sheet from outside;
   a recording sheet transport section for transporting said recording sheet between said second opening and said first opening, said first opening is commonly used as a first opening of said original transport section;
   a recording section for recording onto said recording sheet which is transported by said recording sheet transport section, said recording section is provided substantially in parallel with said original reading section, and further having a second roller which conveys said recording sheet and receives force from a recording head; and
   a power-supply accommodating portion for a battery that drives said original reading section and said recording section, said battery storage portion being arranged at a rear portion of said original recording section, thus forming said apparatus main body both flat and compact.

2. The apparatus according to claim 1, further comprising:
   a roll-sheet holder provided in back of said apparatus main body;
   said roll-sheet holder accommodating a roll sheet inserted from the second opening of said apparatus main body.

3. The apparatus according to claim 2, wherein said roll-sheet holder has a cover member for covering the second opening of said apparatus main body.

4. The apparatus according to claim 1, wherein a power-supply unit of said power-supply accommodating portion is a power-supply battery pack provided so as to be freely attachable and detachable in a direction substantially perpendicular to the bottom of said apparatus main body.

5. The apparatus according to claim 1, wherein the first roller of said original reading section and a second roller of said recording section are arranged at approximately the same height within said apparatus main body.

6. The apparatus according to claim 1, further comprising:
   a first circuit board arranged so as to lie along the bottom surface of said apparatus main body between said recording section and said power-supply accommodating portion; and
   a second circuit board arranged so as to lie along a rearward upper surface of said apparatus main body.

7. The apparatus according to claim 6, wherein discrete components of comparatively large height are mounted on said first circuit board and chip components of comparatively small height are mounted on said second circuit board.

8. A thin-type facsimile apparatus comprising:
   an apparatus main body constituting surface of said thin-type facsimile apparatus;
   a first opening formed in an upper surface portion of said main body, said first opening being provided to insert an original;
   a front surface opening formed in a front surface of said apparatus main body;
   an original transport section for transporting said original between said first opening and said front surface opening;
   an original reading section for reading said original transported by said original transport section, said original reading section having a reading line head, a first roller for conveying an original in a state biased with respect to said reading line head for reading, a first biasing member for biasing said first roller with respect to said reading line head for reading;
   a second opening formed in an upper surface of said main body at a position closer to a rear side than said first opening, said second opening being provided to insert a recording sheet from outside;
   a recording sheet transport section for transporting said recording sheet between said second opening and said first opening, said first opening is commonly used as a first opening of said original transport section;
   a recording section for recording onto said recording sheet which is transported by said recording sheet transport section;

said recording section being provided rearwardly of said original reading section and having, a recording line head for recording, a second roller for conveying a recording sheet in a state biased with respect to said recording line head for recording and a second biasing member for biasing said roller with respect to said recording line head for recording;

a power supply accommodating portion for a battery that drives said original reading section and said recording section, said battery storage portion being arranged at a rear portion of said original recording section, thus forming said main body both flat and compact; and a supporting member for supporting said first or second biasing member, said supporting member freely movably supporting said reading line head or said recording line head at a support portion in such a manner that movement thereof is limited by a limiting portion.

9. The apparatus according to claim 8, wherein a direction in which said reading line head for reading or said recording line head for recording is free to move due to said supporting member is the direction of a normal line passing through a point of contact between said line head and said first or second roller.

10. The apparatus according to claim 9, wherein the support portion and limiting portion of said line head are pins, and said support portion is formed to have grooves corresponding to respective ones of said pins.

11. The apparatus according to claim 10, wherein said supporting member is provided with a plurality of equidistantly spaced urging points of said biasing member for biasing said line head in such a manner that it will substantially lie along the direction of the normal line.

12. The apparatus according to claim 11, wherein the plurality of urging points of said biasing member provided on said supporting member are disposed at least at six locations.

13. The apparatus according to claim 11, wherein among said urging points of said biasing member, points of distal ends are positioned outside of said recording sheet.

14. A thin-type facsimile apparatus comprising:

an apparatus main body constituting surface of said thin-type facsimile apparatus;

a first opening formed in an upper surface portion of said main body, said first opening being provided to insert an original;

a front surface opening formed in a front surface of said apparatus main body;

an original transport section for transporting said original between said first opening and said front surface opening;

an original reading section for reading said original transported by said original transport section, said original reading section is provided in a front portion of said apparatus main body, and further having a first roller which conveys said original with a biased state against a reading line head;

a second opening formed in an upper surface of said apparatus main body at a position closer to a rear side than said first opening, said second opening being provided to insert a recording sheet from outside;

a recording sheet transport section for transporting said recording sheet between said second opening and said first opening, said first opening is commonly used as a first opening of said original transport section;

a recording section for recording onto said recording sheet which is transport by said recording sheet transport section, said recording section is provided substantially in parallel with said original reading section, and further having a second roller which conveys said recording sheet with a biased state against a recording line head;

a power-supply accommodating portion for a battery that drives said original reading section and said recording section, said battery storage portion being arranged at a rear portion of said original recording section, thus forming said apparatus main body both flat and compact; and a dual-purpose member, which is integrally provided with said reading line sensor biased against said first roller, for serving as a positioning portion for positioning said reading line head and a guiding portion for guiding the original and the recording sheet so as to move along the first opening of said apparatus main body.

15. The apparatus according to claim 14, wherein said dual-purpose member has a ridge line formed to include a blade portion for cutting the recording sheet, said blade portion being provided internally of the first opening of said apparatus main body.

16. The apparatus according to claim 14, wherein said dual-purpose member has a biasing spring for biasing said first roller so as to lie substantially along the direction of a normal line.

* * * * *

UNITED STATES PATENT AND TRADEMARK OFFICE
CERTIFICATE OF CORRECTION

PATENT NO. : 5,420,701

DATED : May 30, 1995

INVENTOR(S) : HIDEYUKI TERASHIMA, ET AL.

It is certified that error appears in the above-identified patent and that said Letters Patent is hereby corrected as shown below:

ON TITLE PAGE

In [57] ABSTRACT, Line 6: "top" should read --a top--.

COLUMN 2

Line 14, "if" should read --is--.
Line 32, "necessary" should read --necessary to provide--.
Line 53, "coils" should read --coil--.
Line 54, "spring 120" should read --springs 120--.

COLUMN 3

Line 45, "if" should read --is--.
Line 63, "necessary" should read --necessary to provide--.

COLUMN 4

Line 15, "coils" should read --coil--.
Line 16, "spring 120" should read --springs 120--.
Line 68, "of" should be deleted.

COLUMN 5

Line 61, "for" should read --from--.

COLUMN 11

Line 37, "of" should read --or--.

UNITED STATES PATENT AND TRADEMARK OFFICE
CERTIFICATE OF CORRECTION

PATENT NO. : 5,420,701

DATED : May 30, 1995

INVENTOR(S) : HIDEYUKI TERASHIMA, ET AL.

It is certified that error appears in the above-identified patent and that said Letters Patent is hereby corrected as shown below:

COLUMN 12

Line 36, "in" should be deleted.

COLUMN 14

Line 55, "the" should read --then--.

COLUMN 15

Line 26, "gram" should read --grams--.

COLUMN 16

Line 23, "ence" should read --ent--.
Line 42, "is" should read --are--.

COLUMN 20

Line 45, "capable" should read --capable of--.

COLUMN 25

Line 32, "surface" should read --a surface--.

COLUMN 26

Line 39, "surface" should read --a surface--.

UNITED STATES PATENT AND TRADEMARK OFFICE
CERTIFICATE OF CORRECTION

PATENT NO. : 5,420,701

DATED : May 30, 1995

INVENTOR(S) : HIDEYUKI TERASHIMA, ET AL.

It is certified that error appears in the above-identified patent and that said Letters Patent is hereby corrected as shown below:

COLUMN 27

Line 46, "surface" should read --a surface--.

COLUMN 28

Line 23, "transport" should read --transported--.

Signed and Sealed this

Twelfth Day of December, 1995

Attest:

BRUCE LEHMAN

Attesting Officer     Commissioner of Patents and Trademarks